United States Patent [19]

Nishi et al.

[11] Patent Number: 4,480,443
[45] Date of Patent: Nov. 6, 1984

[54] AUTOMOTIVE REFRIGERATION SYSTEM

[75] Inventors: Yasuyuki Nishi; Masao Sakurai, both of Oobu; Masashi Takagi, Kariya, all of Japan

[73] Assignee: Nippondenso Co., Ltd., Kariya, Japan

[21] Appl. No.: 372,380

[22] Filed: Apr. 27, 1982

[30] Foreign Application Priority Data

Apr. 30, 1981 [JP] Japan ................................ 56-66724
May 4, 1981 [JP] Japan ................................ 56-67320
May 20, 1981 [JP] Japan ................................ 56-77119

[51] Int. Cl.³ .......................... F25B 27/00; B60H 3/04
[52] U.S. Cl. ........................................ 62/227; 62/158; 62/228.5; 62/231; 62/243; 62/323.4
[58] Field of Search .................... 62/228.5, 227, 228.3, 62/158, 157, 231, 244, 243, 196.1, 196.2, 196.3, 323.4; 165/43; 236/1 EA

[56] References Cited

U.S. PATENT DOCUMENTS

| | | | |
|---|---|---|---|
| 2,304,999 | 12/1942 | Gonzalez | 62/229 |
| 2,401,827 | 6/1946 | Heitchue | 62/196.2 X |
| 2,556,882 | 6/1951 | Minkler et al. | 62/228.5 |
| 2,920,812 | 1/1960 | Courtney, Jr. | 62/228.5 X |
| 3,121,314 | 2/1964 | Koyanagi | 62/133 |
| 3,491,546 | 1/1970 | Holzer | 62/227 X |
| 4,065,229 | 12/1977 | Black | 417/270 |
| 4,132,086 | 3/1977 | Kountz | 62/228.5 X |
| 4,206,613 | 6/1980 | Shockley | 62/133 |
| 4,289,272 | 9/1981 | Murase et al. | 236/91 D |

FOREIGN PATENT DOCUMENTS 0028453 5/1981 European Pat. Off. .

Primary Examiner—Harry Tanner
Attorney, Agent, or Firm—Cushman, Darby & Cushman

[57] ABSTRACT

An automotive air conditioner has an air duct in which a refrigerant evaporator of a refrigeration cycle is disposed in fluid-flow communication with a variable capacity refrigerant compressor to be drivingly connected to or disconnected from an automotive engine and provided with compressor displacement varying members. The position of the compressor displacement varying members is electronically controlled such that they are placed in the minimum compressor displacement position each time when the compressor operation is started.

3 Claims, 21 Drawing Figures

4,480,443

AUTOMOTIVE REFRIGERATION SYSTEM

BACKGROUND OF THE INVENTION

The present invention relates to a refrigeration system for use in an automotive air conditioning system and, more particularly, to a capacity control of the refrigeration system.

DESCRIPTION OF THE PRIOR ART

Figure 1:
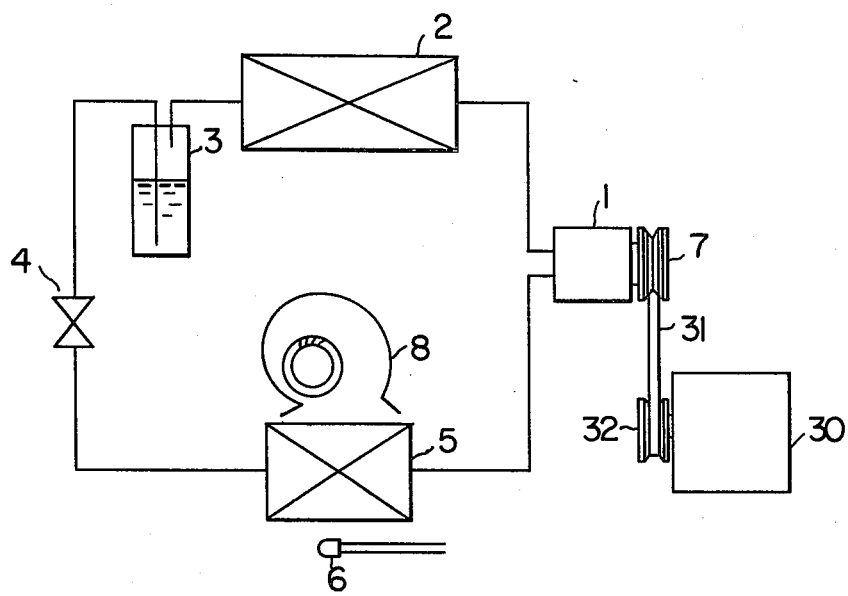
FIG. 1 is a block diagram of the refrigeration cycle of the prior art automotive air conditioner.

As will be seen from FIG. 1, a typical conventional automotive air conditioning system employs a vapor compression type refrigeration cycle consisting essentially of a compressor 1, a condenser 2, a receiver 3, an expansion valve 4 and an evaporator 5. Since the compressor 1 is driven by the automobile engine 30 through an electromagnetic clutch 7, a belt 31 and a pulley 32, the operation speed of the compressor is naturally increased as the engine speed becomes higher. In this conventional air conditioning system, it is often experienced that a frosting or icing takes place on the fins of the evaporator 5, as the surface temperature of the evaporator fins and thus the evaporation temperature of the refrigerant comes down below 0° C. due either to the increase in the operation speed of the compressor or to the reduction in the ambient air temperature. The frosting or icing on the fins reduces the rate of the air flow from a blower 8 through the evaporator 5, resulting in a reduction in the air cooling capacity.

Figure 2:
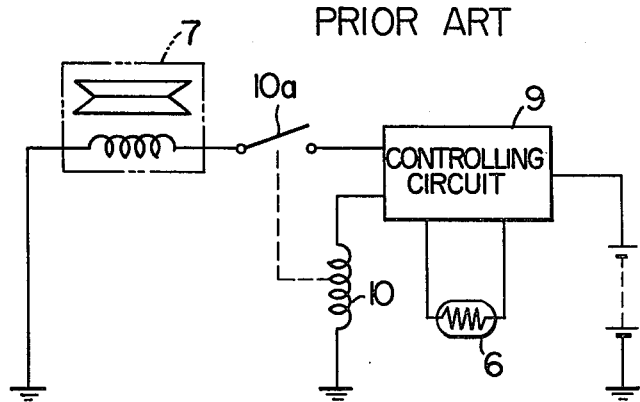
FIG. 2 is an electrical block diagram illustrating a capacity control system of the prior art refrigeration cycle shown in FIG. 1.

In order to prevent the frosting or icing on the evaporator fins or to control the air temperature in the automobile, therefore, the temperature of air just downstream of the evaporator 5 is detected by a temperature detector 6 such as a thermistor which is electrically connected to a control circuit 9 shown in FIG. 2 so that a relay 10 is controlled in accordance with the output from the temperature detector to open and close a contact 10a to engage or disengage the electromagnetic clutch 7, whereby the period of operation of the compressor is controlled to adjust the evaporation temperature of the refrigerant, thereby to control the air temperature immediately downstream of the evaporator.

This arrangement, however, has the following drawback. Namely, when the engine ignition switch is turned on to start the engine while the conditioner switch is kept closed, the electromagnetic coil of the clutch 7 is energized to drivingly connect the compressor 1 to the engine so that the compressor operation is started simultaneously with the start of the engine operation. In the initial stage of the engine operation, however, the engine runs at a low speed and, in addition, provides a small output. Accordingly, the power required to operate the compressor amounts to 20 to 30% of the engine output. This adversely affects the engine starting operation or so-called "startability". In the case where the air-conditioner switch is turned on during engine operation, i.e., during operation of the motorcar, the electromagnetic clutch is actuated to drivingly connect the compressor to the engine, so that the compressor is operated abruptly and at a high speed from the first. The compressor starting torque is as high as 2 to 3 times the torque required for the normal compressor operation. This high load is applied to the engine. This load shock not only deteriorates the driving feeling of the motorcar but also adversely affects the operative lives of the compressor and the clutch.

SUMMARY OF THE INVENTION

It is an object of the present invention to provide an improved automotive refrigeration system which eliminates or at least minimizes the problems discussed above.

The automotive refrigeration system according to the present invention comprises a variable capacity refrigerant compressor to be driven by an automotive engine and including means for varying the displacement of the compressor, means for driving the compressor displacement varying means to vary the displacement of the compressor and electric circuit means operative to assure that the compressor displacement varying means are placed in a small compressor displacement position each time when the compressor operation is started.

It is another object of the present invention to provide an automotive air conditioning system incorporating the refrigeration system having the abovementioned structure and arrangement.

The above and other objects, features and advantages of the present invention will be made apparent by the following description with reference to FIGS. 3 to 21.

DESCRIPTION OF PREFERRED EMBODIMENTS

The refrigeration systems embodying the present invention basically employ refrigeration cycles identical to the prior art refrigeration cycle discussed with reference to FIG. 1. Thus, the parts of the respective embodiments of the invention similar to those of the prior art refrigeration cycle are designated by the same reference numerals. Description of the refrigeration cycle itself is omitted accordingly.

Figure 3:
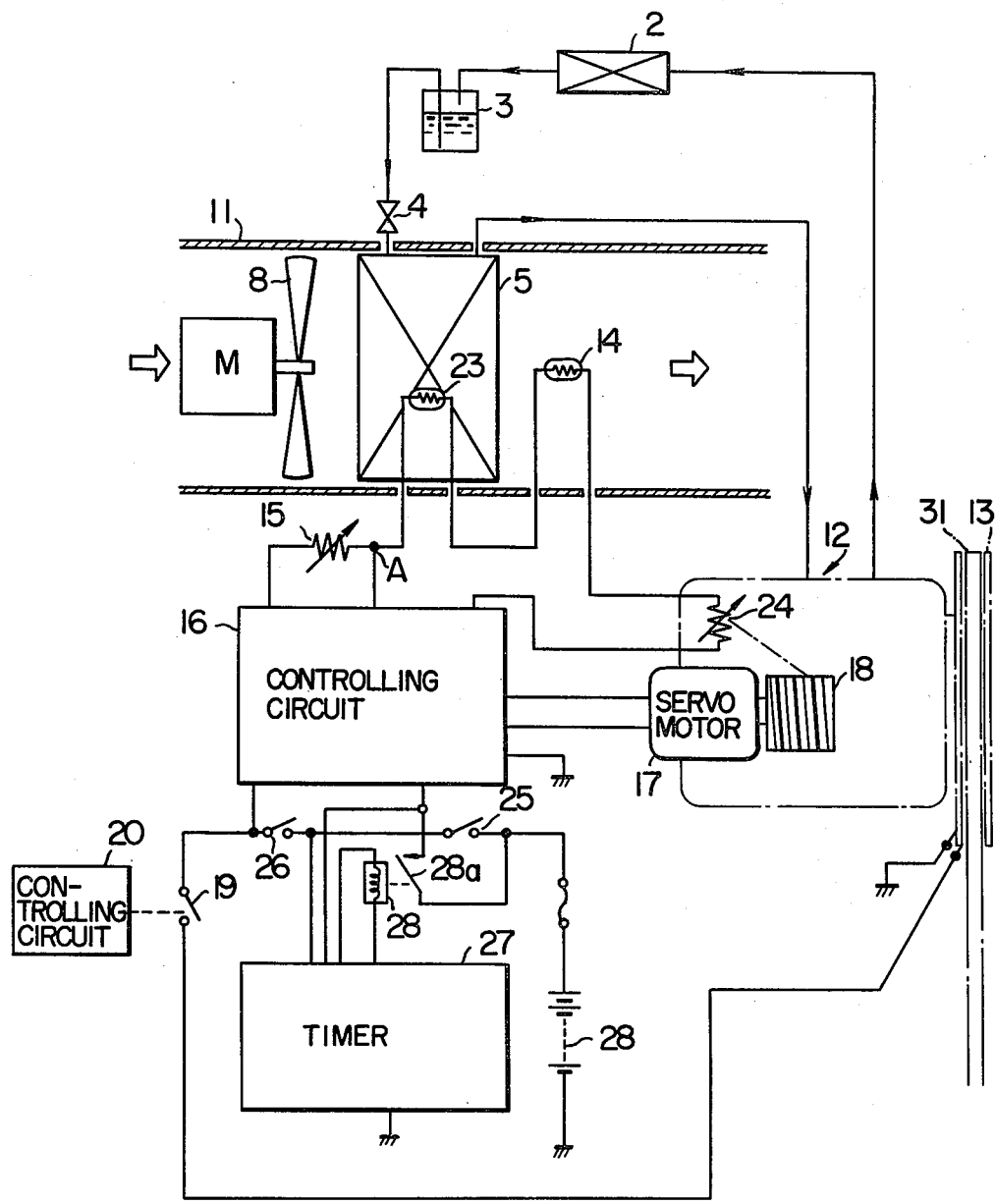
FIG. 3 is a diagrammatic illustration of an embodiment of the refrigeration system according to the present invention.

FIG. 3 shows the whole part of a first embodiment of the refrigeration system of the invention. The refrigeration system has an evaporator 5 and a motor-driven blower 8 disposed in a plastic duct 11 of an automotive air conditioner. The duct is communicated at its left-hand end with an ambient air intake opening and an internal air intake opening through a communication-switching box which is not shown. The duct is also communicated at its right-hand end with air outlets to the passenger compartment, such as upper air outlets for cooled air and lower air outlets for warmed air. A heater unit, not shown, is disposed in the duct 11. A compressor 12 is connected at its suction or intake side to the outlet end of a refrigerant pipe extending from the discharge port of the evaporator 5. The compressor 12 is adapted to be driven by the engine of the automobile through an electromagnetic clutch 13 and the belt 31. As will be described later, this compressor 12 is of variable capacity or discharge type including displacement varying members for varying the capacity or displacement of the compressor. A temperature detector 14 consisting of a thermistor is adapted to detect the air temperature immediately downstream of the evaporator 5. The air temperature can be set by means of a variable resistor 15. A second temperature detector 23 consisting of a thermistor and adapted to detect the temperature of the refrigerant flowing in the refrigerant pipe in the evaporator 5. The temperature detector 23 is disposed in the refrigerant pipe in the evaporator 5. A position detector 24 is adapted to detect the position of the displacement varying members and disposed in the compressor 12. The position detector 24 consists of a potentiometer operatively connected to one of the displacement varying members. A control circuit 16 is adapted to receive signals from the elements 14, 15, 23 and 24. Namely, the elements 14, 23 and 24 are connected in series, and the electric potential at the point of juncture A between this series circuit and the pre-set resistor 15 is delivered to the control circuit 16.

Reference numeral 25 denotes an ignition switch of an automotive engine operative to control electric power supply to circuits on the engine, such as an ignition circuit. The switch 25 acts as an electric power supply switch. Reference numeral 26 designates an electric switch of the automotive air conditioning system operative to start and stop the system. Numeral 27 denotes a timer circuit while numeral 28 designates a relay coil controlled by the timer circuit 27 to open and close a relay coil 28a.

Reference numeral 17 designates a servo motor for driving the displacement varying members in the compressor 12. The servo motor 17 is adapted to be controlled in accordance with an output of the control circuit 16. The driving torque produced by the servo motor 15 is transmitted through a worm gear 18 to the displacement varying members of the compressor 12. Reference numeral 19 denotes a normally closed relay contact for switching on and off the electrical supply to the electromagnetic clutch 13 thereby to engage and disengage the compressor 12 with and from an automotive engine, not shown. A control circuit 20 is adapted to detect the engine speed and ambient air temperature and to open the relay contact 19 upon detection of reduction in the compressor speed and the ambient air temperature. Reference numeral 22 designates batteries mounted on the automobile.

Figure 4:
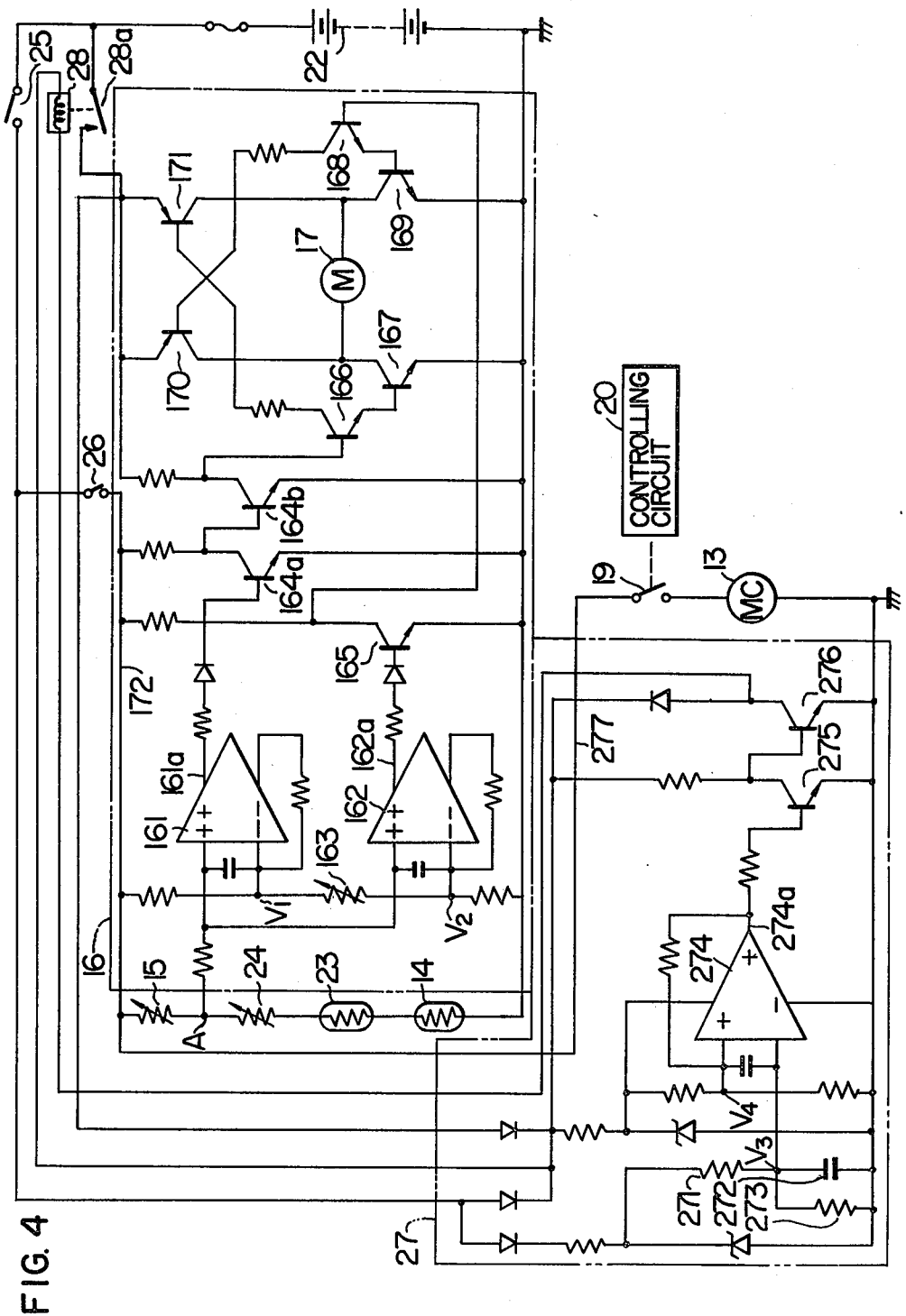
FIG. 4 shows an electric circuitry of the controlling circuit of the system shown in FIG. 3.

Referring now to FIG. 4, practical examples of the control circuit 16 and timer 27 include a pair of comparators 161 and 162 each of which has an input terminal connected to a point of juncture A between the variable resistor 15 and the series circuit formed by the elements 14, 23 and 24. The first comparator 161 is adapted to receive at its other input terminal a reference voltage $v_1$ while the second comparator 162 receiver at its other input terminal a reference voltage $v_2$ which is lower than the reference voltage $v_1$ applied to the first comparator 161. The difference between two reference voltage $v_1$ and $v_2$ is adjustable by means of a variable resistor 163. The first comparator 161 has an output 161a which is electrically connected to switch transistors 164a and 164b on and off, while the second comparator 162 has an output 162a which is electrically connected to switch a transistor 165 on and off. Reference numerals 166 to 171 denote transistors for driving the servo motor 17.

Figure 5:
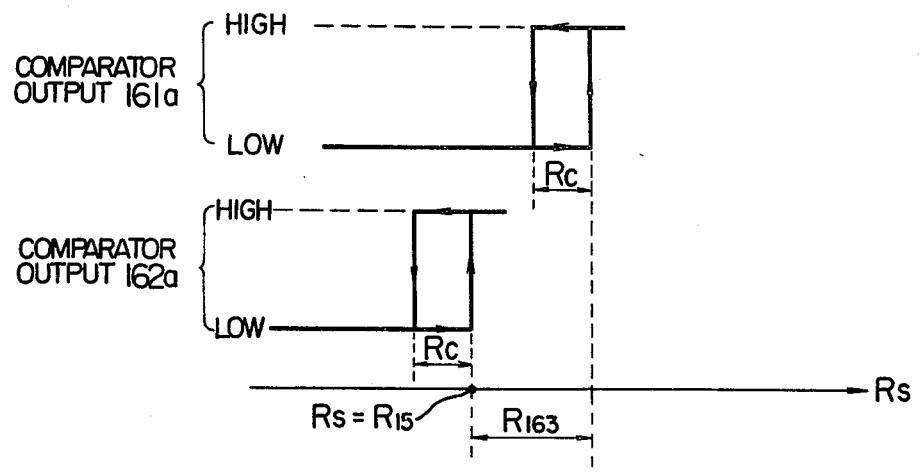
FIG. 5 illustrates the operation characteristics of the comparators of the electric circuitry shown in FIG. 4.

FIG. 5 shows the operation characteristics of the control circuit 16. The control circuit 16 is adapted to control the rotational position of the servo motor 17 such that a balance is obtained between the resistance value $R_{15}$ of the pre-set resistor 15 and the sum Rs of the resistances of the resistance $R_{14}$ of the thermistor constituting the temperature detector 14, the resistance $R_{23}$ of the thermistor constituting the temperature detector 23 and the resistance $R_{24}$ of the potentiometer constituting the position detector 24.

The arrangement is such that the output 161a of the first comparator 161 is changed from "Low" level to "High" level when the sum Rs of the series resistances comes to take a value greater than the resistance $R_{15}$ of the pre-set resistor 15 by a resistance $R_{163}$ set by the variable resistance 163, i.e., when $Rs > R_{15} + R_{163}$. To the contrary, the output 161a is changed from the "High" level to the "Low" level when the sum Rs of the series resistances comes down to a level which is lower than the total of resistances $R_{15}$ plus $R_{163}$ by a constant value Rc, i.e., when $Rs < (R_{15} + R_{163}) - Rc$.

On the other hand, the second comparator 162 has is output 162a which is inverted from "Low" level to "High" level at the moment at which Rs is equal to $R_{15}$. To the contrary, the output 162a is inverted from the "High" level to the "Low" level when the sum Rs of series resistances is decreased to a level which is lower than the resistance $R_{15}$ by the predetermined resistance Rc, i.e., when $Rs<R_{15}-Rc$. The resistance Rc is a predetermined resistance range determined by the hysteresis characteristics of the first and second comparators 161 and 162, as discussed previously.

The timer circuit 27 includes a capacitor 272 which is adapted to be charged through a resistor 271 and discharge through a resistor 273. The timer circuit also includes a comparator 274 operative to compare the charging voltage V3 with a reference voltage V4 to provide an output 274a by which transistors 275 and 276 are switched on and off. The transistor 276 is operative to control the electrical supply to the relay coil 28.

An explanation will be made hereinunder as to the construction and operation of the variable capacity type compressor 12.

Figure 6:
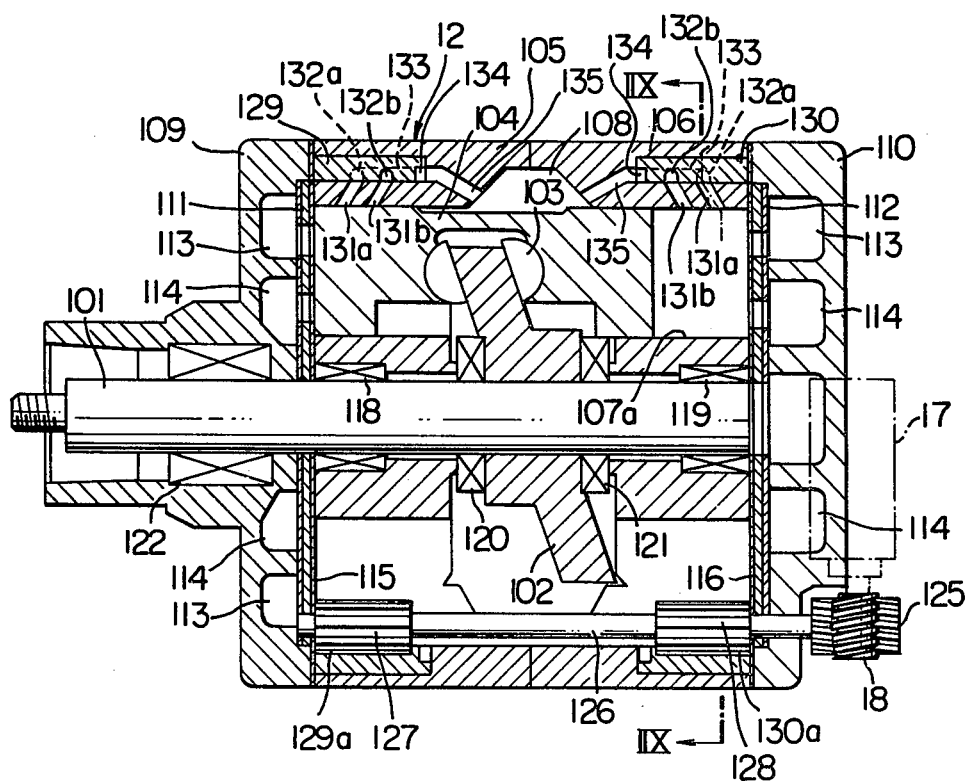
FIG. 6 is an axial sectional view of the compressor shown in FIG. 3 as taken along line VI—VI in FIG. 7.
Figure 7:
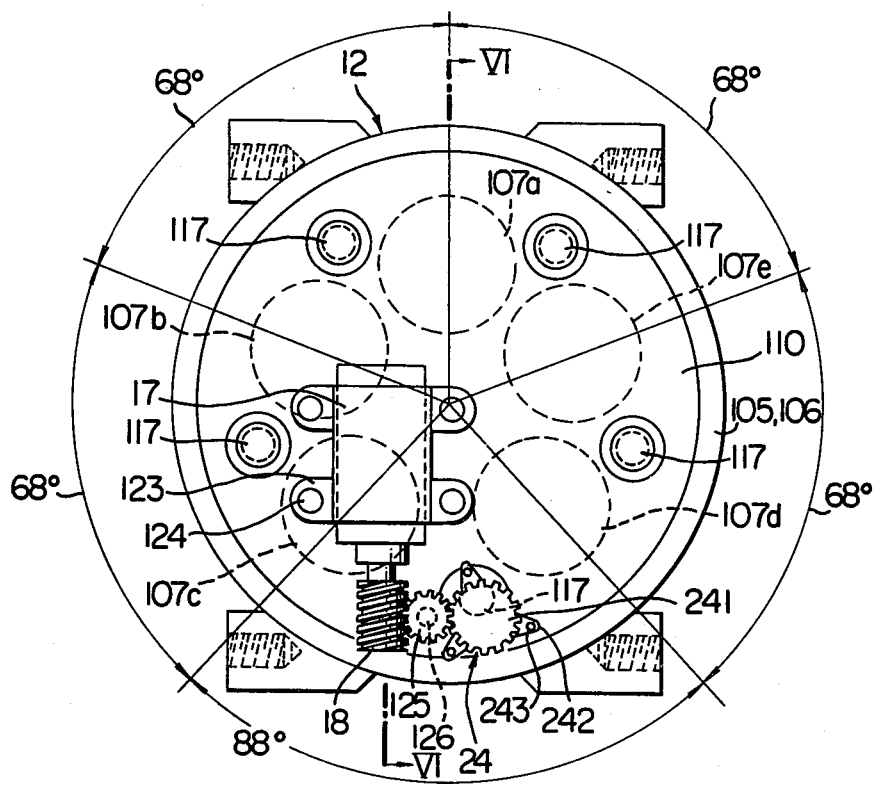
FIG. 7 is an end view of the compressor shown in FIG. 6.
Figure 8:
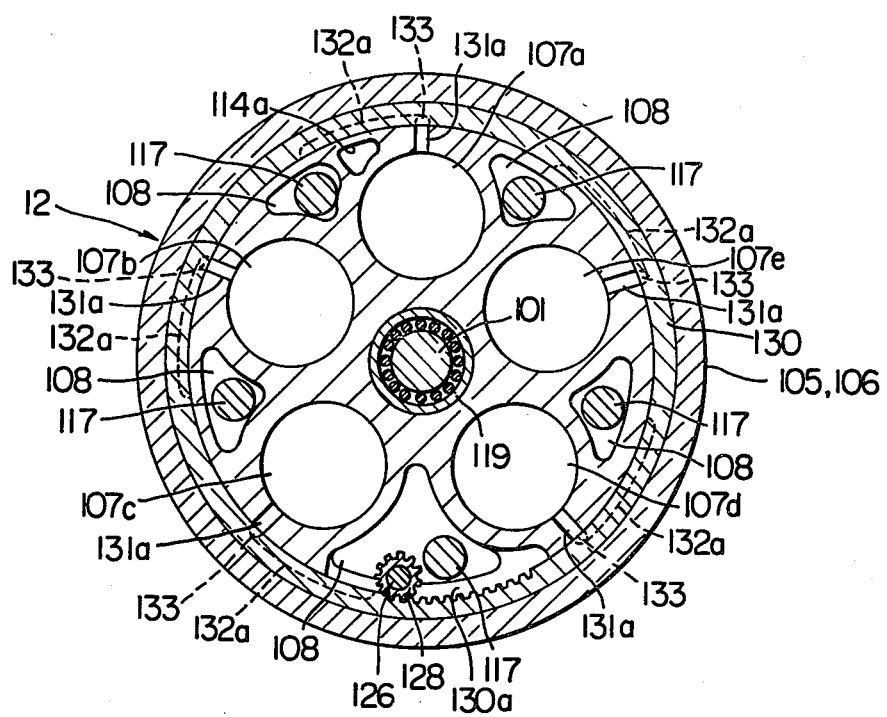
FIG. 8 is a cross-sectional view of the compressor as taken along line IIX—IIX in FIG. 6.
Figure 9:
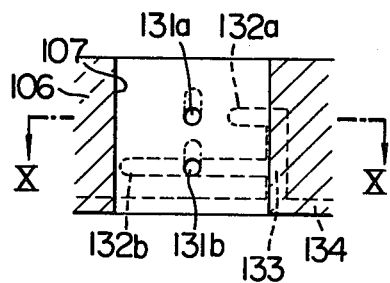
FIG. 9 is an enlarged fragmentary sectional view taken along line IX—IX in FIG. 10 and showing the positional relationship between the by-pass grooves in the capacity or displacement varying ring shown in FIG. 8.
Figure 10:
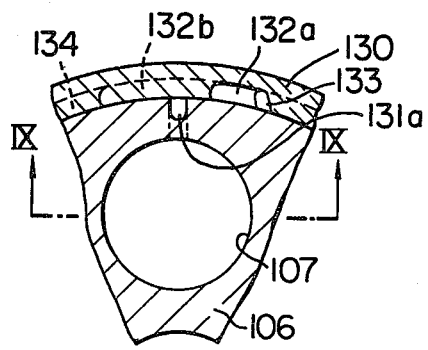
FIG. 10 is an enlarged fragmentary sectional view taken along line X—X in FIG. 9.

Referring to FIGS. 6 to 8, the compressor 12 has a shaft 101 drivingly connected at its left-hand end to the automobile engine through the electromagnetic clutch 13 and the belt 31 shown in FIG. 3. Thus, the compressor 12 is driven by the power of the engine. A swash plate 102 is keyed to the shaft 101 so as to rotate as a unit with the shaft 101. The rotation of the swash plate 102 causes a reciprocating motion of pistons 104 (only one which is shown) which are in sliding contact with the swash plate 102 through shoes 103.

A pair of axially aligned housing members 105 and 106 are connected together to form a cylindrical housing which defines therein five cylinders 107a–107e for slidably receiving the pistons 104. Each of the housing members 105 and 106 is formed from aluminum or the like material by die-casting. There are five axial suction passages 108 formed in the housing members 105 and 106. As will be seen in FIGS. 7 and 8, the cylinders are circumferentially arranged at a constant angular pitch of 68° with the exception that the angular distance between the two lowermost cylinders 107c and 107d is 88°. Each suction passage 108 is disposed between pair of adjacent cylinders and is connected to a common refrigerant introduction passage (not shown) which is communicated with the outlet side of the refrigeration circuit in the evaporator 5.

End housing members 109 and 110 are disposed at the axially outer ends of the housing members 105 and 106 and secured to them with valve plates 111 and 112 sandwiched therebetween. Each of the end housing members 109 and 110 is formed therein with a suction chamber 113 which is communicated with the suction passages 108 through suction side communicating holes (not shown) formed in the associated valve plate 111 or 112. Each of the end housing members 109 and 110 is further formed therein with a discharge chamber 114 disposed radially inwardly of the suction chamber 113 and opposing to the cylinders 107a to 107e. These discharge chambers 114 are communicated with discharge passages 114a (see FIG. 8) in the housing members 105 and 106 through discharge side communication holes (not shown) formed in respective valve plates 111 and 112. Between the valve plates 111 and 112 and the associated housing members 105 and 106, disposed are disc-shaped resilient metallic plates 115 and 116 made of a resilient metallic material such as spring steel. Each of the resilient metallic plates 115 and 116 is provided, at its portions opposing to the cylinders 107a to 107d, with U-shaped cuts (not shown) to form suction valves. The housing members 105 and 106, the end housing members 109 and 110 and the valve plates 111 and 112 are assembled and secured together by means of tie bolts 117 to form the housing of the compressor. In order to facilitate the assembling, the compressor is designed such that the tie bolts 117 extend through the suction passages 108 in the housing members 105 and 106.

The shaft 101 is rotatably supported by radial bearings 118 and 119 constituted by ordinary needle bearings having outer races fixed to the housing members 105 and 106. Thrust bearings 120 and 121 are disposed between the central portion of the housing member 105 and the swash plate 102 and between the swash plate 102 and the central portion of the housing member 106, respectively, and are adapted to bear against the axial thrust force acting on the swash plate 102, i.e., the reactional force which is generated when the swash plate reciprocally drives each piston in the axial direction. A shaft seal 122 is disposed in one of the end housing members 109 disposed adjacent to the electromagnetic clutch 13 and is adapted to provide a tight seal between this end housing member 109 and the shaft 101 to prevent leakage of the refrigerant gas and the lubrication oil from the compressor.

Referring now to FIG. 7, a support 123 for the servo motor 17 is fixed by means of screws 124 to the end housing member 110 remote from the electromagnetic clutch 13. The worm gear 18 of the servo motor 17 is drivingly connected to an operation shaft 126 through a worm gear 125. The operation shaft 126 is positioned between the lowermost cylinders 107a and 107d and axially extends through the two valve plates 111 and 112. Spur gears 127 and 128 are secured to the portions of the operation shaft 126 adjacent to the valve plates 111 and 112.

Rings 129 and 130 constitute the above-mentioned compressor capacity or displacement varying members and are arranged concentrically with the drive shaft 101 of the compressor and disposed within cylindrical spaces formed in the housing members 105 and 106 radially outwardly of the cylinders 107a to 107e. The displacement varying rings 129 and 130 are provided with internal teeth 129a and 130a which engage the spur gears 127 and 128 on the operation shaft 126 so that the torque of the operation shaft 126 is transmitted to the displacement varying rings 129 and 130 to rotate them.

Two generally radial by-pass holes 131a and 131b are formed in the portion of the wall of eacy cylinder adjacent to each displacement varying ring. Circumferential by-pass grooves 132a and 132b are formed in the inner peripheral surfaces of the displacement varying rings 129 and 130. Axial by-pass grooves 133 are also formed in the displacement varying rings 129 and 130 so as to extend in parallel with the shaft 101. Annular by-pass grooves 134 are formed in the axially inner end portions of the inner peripheral surfaces of the displacement varying rings 129 and 130 and extend over the entire circumference of the rings 129 and 130. By-pass ports 135 are formed in the housing members 105 and 106. The arrangement is such that the by-pass holes 131a and 131b are open to the cylinders 107a to 107e and are adapted to be communicated with the by-pass ports 135 through the by-pass grooves 132a and 132b, the by-pass grooves 133 and the by-pass grooves 134. The by-pass ports 135 further lead to the suction passages 108 formed in the housing members 105 and 106.

In the illustrated embodiment, the positions of the by-pass holes 131a and 132b formed in the wall of each cylinder are so selected as to divide the cylinder chamber on each side of the associated piston into three sections of substantially equal volume. The arrangement is such that the displacement varying rings 129 and 130 are rotatable to take a first position in which they permit only the by-pass holes 131b adjacent to the axial center of the compressor to be communicated with the corresponding by-pass grooves 132b and a second position in which the rings 129 and 130 permit both of the by-pass holes 131a and 131b to be communicated with the corresponding by-pass grooves 132a and 132b, as will be seen in FIGS. 9 and 10.

The combination of the by-pass grooves 132a and 132b is provided for each of the cylinders 107a to 107e. The by-pass grooves 132a and 132b for different cylinders, however, have different lengths in the circumferential direction of the displacement varying rings 129 and 130 (see FIG. 11) so that the number of cylinders communicating with the suction passages 108 varies depending on the rotation or angular position of the displacement varying rings 129 and 130. More specifically, all of the 20 (twenty) by-pass holes 131a and 131b directly oppose to the by-pass grooves 133 in the displacement varying rings 129 and 130 when the angle of rotation of the displacement varying rings 129 and 130 is 0° (initial position). In consequence, all by-pass holes 131a and 131b are communicated with the suction passages 108 through the by-pass grooves 133, the by-pass grooves 134 and through the by-pass ports 135 in the housing members 105 and 106. In this state, the effective or net volume of the compressor is minimum. When the displacement varying rings 129 and 130 take positions rotated by 4° from the initial position mentioned above, only the by-pass holes 131a communicating with the cylinder 107e fail to communicate with the associated by-pass grooves 132a and all of the other by-pass holes 131a and 131b are held in communication with the suction passages 108. As the angle of rotation of the displacement varying rings is increased stepwise to 8° and then to 12° at an angular interval of 4°, the number of the by-pass holes failing to communicate with the suction passages 108 is progressively increased one by one. Thus, when the displacement varying rings 129 and 130 take positions rotated by 36° from the initial 0° position, only the by-pass holes 131b open to the cylinder 107a are communicated with the suction passages 108 though the by-pass grooves 132b while all of the other by-pass holes are isolated from the suction passages. When the displacement varying rings 129 and 130 take positions rotated 40° from the initial 0° position, all of the by-pass holes 131a and 131b in the compressor are blocked, so that the net cylinder volume of the compressor takes the maximum value.

Figure 12:
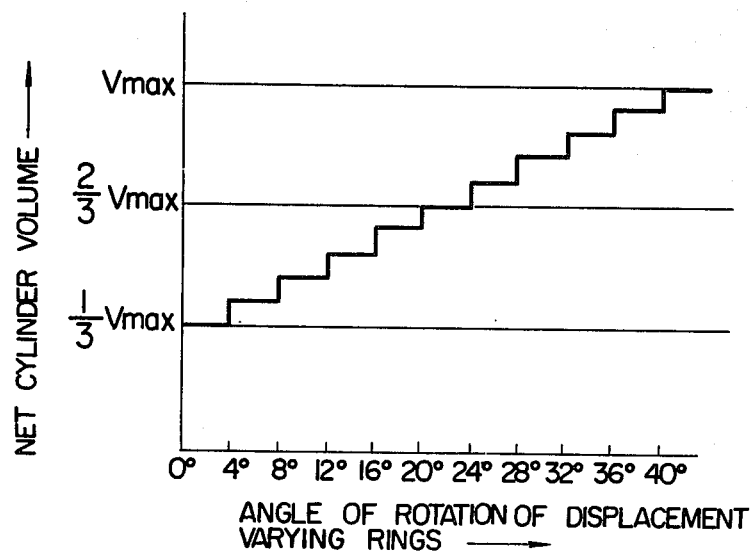
FIG. 12 graphically illustrates the relationship between the angle of rotation of the displacement varying rings and the effective or net cylinder volume or displacement of each cylinder.

The relationship between the net cylinder volume of the compressor and the rotational positions of the displacement varying rings 129 and 130 will be clearly seen in FIG. 12. It will be understood that the net cylinder volume of the compressor is varied by 10 stages between the maximum value Vmax and the minimum value which amounts to one third (⅓) the Vmax.

The rotational position of the displacement varying rings 129 and 130 is detected by the potentiometer constituting the position detector 24 which will emit an electric signal. Namely, as shown in FIG. 7, the worm gear 125 provided on one end of the operation shaft 126 meshes also with a drive gear 241 of the position detector 24, so that the resistance value of the potentiometer constituting the position detector 24 is varied in accordance with the rotation of the worm gear 125, i.e., the rotation of the operation shaft 125. In consequence, the position detector 24 provides an electric signal corresponding to the position of the displacement varying rings 129 and 130. The position detector 24 is secured by means of screws 243 and a stay 242 to the end housing member 110. The portions of the outer surface of the end housing member 110 at which the position detector 24 and the servo motor 17 are secured to the end housing member 110 are recessed to accommodate the position detector and the servo motor and to reduce the amounts of projection of these components from the end face of the end housing member 110. A suitable cover member (not shown) may be secured to the end housing member so as to keep dusts and other contaminants away from the servo motor 17, the worm gears 18 and 125 and the position detector 24.

The operation of the swash plate type compressor 12 will be described hereunder. When the electromagnetic clutch is engaged, the shaft 101 starts to rotate together with the swash plate 102. The refrigerant gas evaporated in the evaporator 5 is introduced into the suction passages 108 through suction holes (not shown) formed in the housing members 105 and 106 and then into the suction chambers 113 in both end housing members 109 and 110 through the suction communication holes (not shown) formed in respective valve plates 111 and 112. As the swash plate 102 rotates, the pistons 104 are reciprocally moved in respective cylinders 107a to 107e. In consequence, the refrigerant is introduced into a cylinder when in its suction stroke through the suction hole in the valve plate 111 or 112 and then through the suction valve formed in the resilient metallic plate 115 or 116. When the piston in the cylinder is turned to the compression stroke, the suction valve of the cylinder is closed so that the refrigerant gas in this cylinder is compressed by the piston and is discharged into the discharge chamber 114 in the end housing member 109 or 110 through the discharge hole formed in the valve plate 111 or 112 and through the discharge valve. The compressed refrigerant gas is then discharged into the discharge passage chamber 114a in the housing member 105 or 106 through the discharge communication hole formed in the valve plate 111 or 112 and is delivered to the condenser 2 of the refrigeration cycle through a discharge port (not shown) formed in each of the housing members 105 and 106.

During the operation of the compressor, the rotational speed of the shaft 101 varies in accordance with the variation in the speed of the engine, so that the displacement of the refrigerant gas from the compressor is also changed in accordance with the change in the engine speed. Thus, the displacement may exceed the demand by the refrigeration cycle particularly when the engine is operating at a high speed. It is to be noted, however, that the refrigeration system of the described embodiment is responsive to any variation in the demand to reduce the displacement of the compressor 12.

Figure 11:
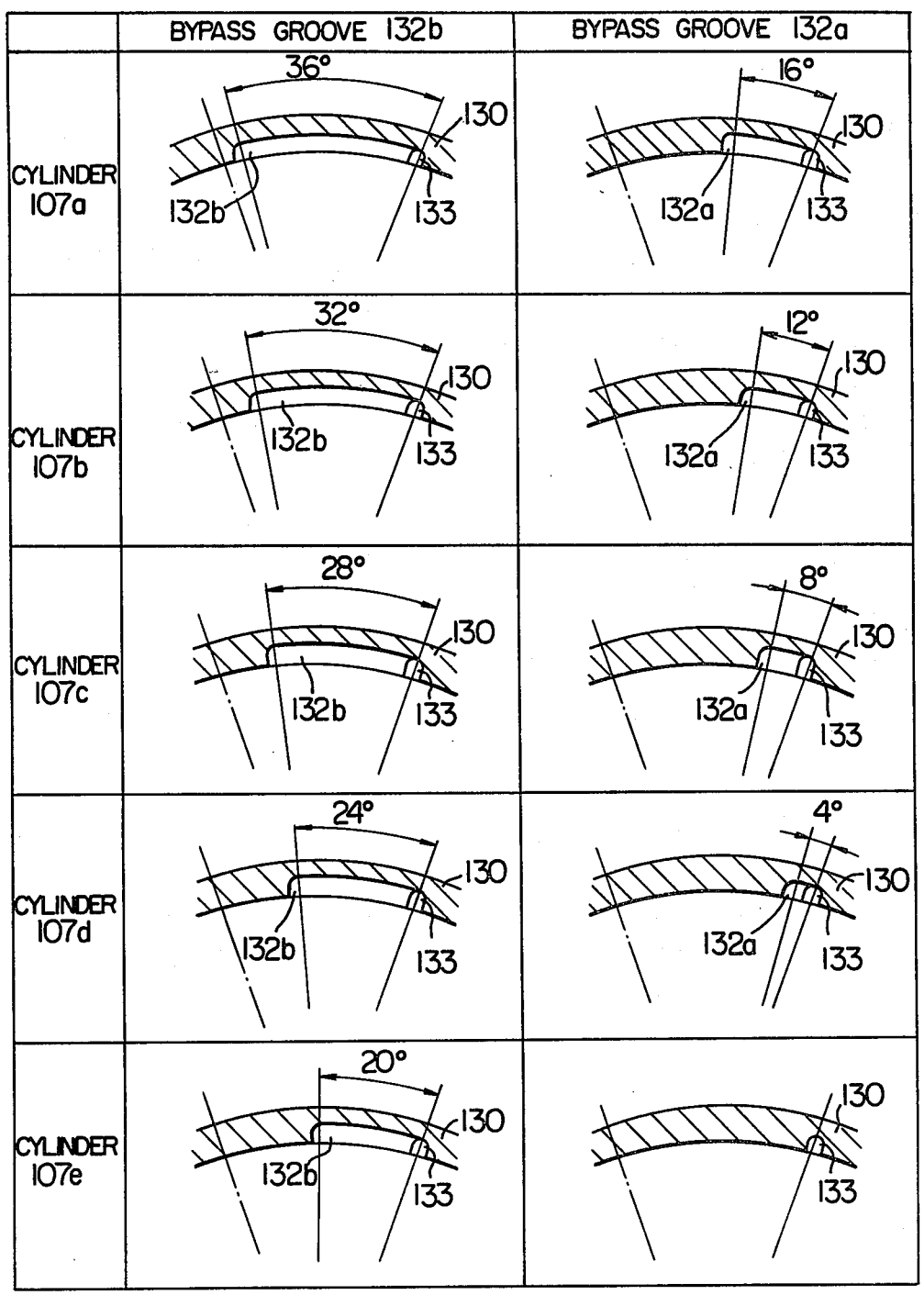
FIG. 11 is an illustrative table showing the shapes of by-pass grooves associated with respective cylinders in the compressor.

The control of the displacement of the compressor 12 in relation to the demand by the refrigeration cycle is achieved in a manner described hereunder. When the refrigeration system is operated, switches 25 and 26 are closed and a contact 28a of a relay 28 is also closed as discussed later. As explained before, the air temperature immediately downstream of the evaporator 5 is detected by the temperature detector 14. When the detected air temperature rises due to an increase in the load on the refrigeration system, the resistance $R_{14}$ of the thermistor constituting the temperature detector 14 is decreased with a resultant decrease in the sum $R_s(R_{14}+R_{23}+R_{24})$ of the series resistances to a level which is lower than the resistance $R_{15}$ of the pre-set resistor 15. Referring back to FIG. 5, when $R_s$ is decreased to a level lower than a level which is equal to $R_{15}$ minus $R_c$ ($R_s < R_{15} - R_c$), the level of the output 162a of the second comparator 162 is inverted from "High" level to "Low" level to switch the transistor 165 off. In consequence, the transistors 168, 169 and 170 are switched on. At this time, the output 161a of the first comparator 161 takes the "Low" level as will be seen in FIG. 5, so that the transistor 164a takes the "off" state while the transistor 164b takes the "on" state. In consequence, the transistors 166, 167 and 171 are switched off. As a result, the servo motor 17 is supplied with electric current through the emitter and collector of the transistor 170 and the collector and emitter of the transistor 169, so that the shaft of the servo motor is rotated in the normal or forward direction to rotate the displacement varying rings 129 and 130 in the clockwise direction, as viewed in FIG. 8, via the worm gear 125, the operation shaft 126 and the spur gears 127 and 128. Thus, the angle of rotation of the displacement varying rings 129 and 130 as shown in FIG. 11 is increased to increase the net cylinder volume of the compressor. In consequence, the displacement of the compressor is increased, so that the air temperature just downstream of the evaporator 5 is gradually lowered to gradually increase the resistance $R_{14}$ of the temperature detector 14.

The rotation of the displacement varying rings 129 and 130 is detected by the position detector 24 to increase the resistance $R_{24}$. When the sum $R_s$ of the series resistances exceeds the resistance $R_{15}$ of the preset resistor 15, the output 162a of the second comparator 162 comes to the "High" level so that the transistor 165 is switched on to switch off the transistors 168, 169 and 170. At this time, the output 161a of the first comparator 161 still takes the "Low" level, so that the transistors 166, 167 and 171 continue to take the "off" states. Consequently, the electric power supply to the servo motor 17 is interrupted to stop the rotation thereof to fix the rotational positions of the displacement varying rings 129 and 130, thereby to set the displacement of the compressor at the level which matches with the demand by the refrigeration cycle.

To the contrary, when the air temperature just downstream of the evaporator is lowered due to various reasons such as reduction in the cooling load (reduction in the air temperature upstream of the evaporator), $R_s$ is increased beyond the sum of the resistance $R_{15}$ set by the pre-set resistor 15 and the resistance $R_{163}$ set by the variable resistor 163 (i.e., $R_s > R_{15} + R_{163}$), the output 161a of the first comparator 161 is changed from "Low" level to "High" level, so that the transistor 164a is switched on while the transistor 164b is switched off, thereby to switch on the transistors 166, 167 and 171. Consequently, the servo motor 17 is supplied with electric current in the direction opposite to that mentioned before, i.e., through the emitter and collector of the transistor 171 and the collector and emitter of the transistor 167, so that the shaft of the servo motor 17 is reserved to rotate the displacement varying rings 129 and 130 in the counter-clockwise direction, as viewed in FIG. 8, via the action of the worm gears 18 and 25, operation shaft 126 and the spur gears 127 and 128. This means that the angle of rotation of the displacement varying members as shown in FIG. 11 is decreased, so that the displacement of the compressor is decreased correspondingly. As a result, the air temperature just downstream of the evaporator 5 is increased to decrease the resistance $R_{14}$ of the temperature detector 14. The position detector 24 detects the new position of the displacement varying rings 129 and 130 to decrease the resistance $R_{24}$. When $R_s$ is decreased to a level which is smaller than a value expressed by $(R_{15}+R_{163})-R_c$, i.e., $R_s < (R_{15}+R_{163})-R_c$. Thus, the output 161a of the first comparator 161 comes to take the "Low" level to switch the transistor 164a off and switch the transistor 164b on, so that the transistors 166, 167 and 171 are switched off to stop the servo motor 17 again thereby to fix the rotational position of the displacement varying rings 129 and 130.

The rotational position of the displacement varying rings 129 and 130 is continuously detected by the position detector 24 whose output is fed back to the controlling circuit 16, so that any overshoot, i.e., any excessive rotation of the displacement varying rings 129 and 130 can be avoided advantageously, thereby to eliminate the hunting of operation of the servo motor 17 and the displacement varying rings 129 and 130. In consequence, the overshoot and undershoot of the evaporator temperature control can be minimized.

In the case where this refrigeration system is applied to an automotive air conditioner, the compressor 12 is driven by the automobile engine, so that the operation speed of the compressor 12 is widely varied according to variation in the automobile operation. In addition, the condensation capacity of the condenser for liquefying the gaseous refrigerant is largely varied with various states of the automobile operation because the condenser is usually so installed as to be colled by the cooling air flow produced by the ram pressure generated as a result of running of the automobile. Thus, the state of running of the automobile can be considered as a disturbance factor of the automatic control of the evaporator temperature. The variation in the refrigerant flow rate due to change in the operation speed of the compressor and the variation in the condensation capacity of the condenser are closely related to the refrigerant temperature in the evaporator. This knowledge is taken into this embodiment; Namely, the refrigerant temperature in the evaporator is detected by the temperature detector 23 which emits its output to the control circuit 16 which is operative to control the system such that the displacement of the compressor is set to match with the refrigerant temperature in the evaporator. By so doing, it is possible to stabilize the control of the displacement of the compressor 12 to eliminate unnecessary frequent changes of the positions of the displacement varying rings 129 and 130 to thereby ensure a smooth control of the evaporator temperature.

As described, according to the invention, the displacement of the compressor is automatically controlled to match with various states of operation of the air conditioner to optimize the refrigerating capacity. When the temperature of air detected by the temperature detector 14 falls within a predetermined temperature range which corresponds to the resistance $R_{163}$ of the resistor 163 in the illustrated embodiment (see FIG. 5), the electric power supply to the servo motor 17 is stopped to stationarily hold the displacement varying rings 129 and 130 to permit the compressor to operate at a constant displacement.

In order to adjust the air temperature just downstream of the evaporator 5 to avoid the undesirable frosting on the evaporator, it is advisable to control the displacement of the compressor such that this air temperature falls between 3° C. and 5° C.

It is advisable to set a range of temperature as discussed in that, during the time period while the air temperature just downstream of the evaporator 5 falls within this range, the servo motor 17 can be stopped so that the undesirable hunting, i.e., freuent start and stop of the servo motor, is eliminated to shorten the working time of the servo motor even when the cooling demand and/or the engine speed is changed frequently, thereby to improve the durability of the servo motor. It is also to be noted that the above-mentioned predetermined range of set temperature is variable by the variable resistor 163 in accordance with various factors such as the amplitude of the variation of the cooling load.

Furthermore, since the temperature control is achieved by the minute control of the displacement of the compressor, it is possible to maintain the compressor 12 in operative state continuously over a wide range of operation of the air conditioner without requiring frequent engagement and disengagement of the electromagnetic clutch 13. In consequence, it is possible to increase the operative lives of the clutch 13 and the compressor 12 as well as to eliminate deterioration of the driving feeling of the automobile. It is also possible to prevent the unpleasant feeling of overcooling or overheating of air which is attributable to the delay of engagement and disengagement of the electromagnetic clutch 13. Moreover, since wasteful operation of the compressor with excessive displacement can be eliminated, the air conditioner employing the refrigeration system of the invention can considerably save power and energy as a whole. In the conventional air conditioner of the type in which the cooling capacity is controlled by a frequent turning on and off of the operation of the compressor, the refrigerant in the evaporator 5 is superheated without delay after the stop of the compressor and, therefore, when the compressor is started again, the compressor is operated wastefully to remove the superheated area for a period of time until the effective cooling of air is started. In the air conditioner employing the refrigeration system of the invention, however, the refrigerant gas is never superheated because the control of the air temperature is performed without stopping the compressor, so that the wasteful operation of the compressor is eliminated economically.

The operation of the air conditioning system is stopped when either the ignition switch 25 or the air-conditioner switch 26 is turned off. Assuming that the ignition switch 25 is closed and the air-conditioner switch 26 is opened, since the electric supply to a line 172 is stopped, the transistor 164b is switched off, the transistors 166, 167 and 171 are switched on while the transistors 168, 169 and 170 are switched off. Thus, the electric current passes through the transistors 171 and 167 to the servo motor 17 so that the motor shaft is rotated in reversed or backward direction to decrease the compressor displacement. This state is forcibly continued independently of the outputs of the comparators 161 and 162, so that the compressor displacement becomes minimum.

In the case where the air-conditioner switch 26 is kept closed and the ignition switch 25 is opened to stop the engine operation and simultaneously stop the air-conditioner operation, the electrical supply to the line 172 is stopped but the electrical supply to an electrical supply line 277 of the timer circuit 27 is continued through the relay contact 28a, so that the transistor 276 remains "on" state to allow the electrical supply to the relay coil 28 to be continued. Also in this case, therefore, the transistors 166, 167 and 171 are switched on to rotate the shaft of the servo motor 17 in the reverse or backward direction to decrease the compressor displacement to the minimum level.

The electrical supply to the capacitor 272 of the timer circuit 27 is stopped when the ignition switch 25 is opened. At this time, therefore, the discharge of the capacitor is started and continued for a predetermined time period (namely, the time period required for the compressor displacement to be made minimum). After the lapse of this time period, the charging voltage V3 of the capacitor 272 is lowered to a level which is lower than the reference voltage V4, so that the output 274a of the comparator 274 becomes "HIGH" level to switch the transistor 275 on and switch the transistor 276 off. Thus, the electrical supply to the relay coil 28 is stopped to open the relay contact 28a, so that the electrical supply to the controlling circuit 16 and to the timer circuit 27 is now completely stopped to prevent any excessive discharge of the battery 22.

As described, when either the engine ignition switch 25 or the air-conditioner switch 26 is opened, the compressor displacement varying members are moved to the minimum displacement position and the compressor 12 is stopped in this position. This advantageously assures that the air conditioning system can be smoothly re-started with a very small power force. This is quite advantageous in that the load shock applied to the engine operation due to re-starting of the air conditioning system during engine operation can be minimized. Thus, even if the air conditioning system is switched on during operation or driving of an associated vehicle, it does not apply such a large load shock to the engine as to deteriorate smooth operation of the vehicle. In addition, even if the engine is stopped with the air-conditioner switch closed, the engine can be re-started with a relatively small power force. Moreover, the compressor and the magnetic clutch are prevented from being subjected to a large shock each time when the air conditioning system is started.

The charging resistor 271 of the capacitor 272 in the timer circuit 27 has a resistance $R_{272}$ which is so set as to be quite lower than the resistance $R_{273}$ of the discharging resistor 273. Thus, when the ignition switch 25 is turned on, the capacitor 272 can be fully charged in quite a short time period so that the output 274a of the comparator 274 becomes "LOW" level quickly to switch the transistor 275 of and switch the transistor 276 on to electrically energize the relay coil 28 for thereby closing the relay contact 28a whereby the electric circuits are ready for starting of the air conditioning system.

In the described embodiment, the by-pass holes 131a and 131b formed in the walls of the cylinders are communicated with the suctions passages 108 through the by-pass grooves 132a and 132b, the by-pass passages 133 and the by-pass passages 134. The by-pass holes 131a and 131b, however, may be communicated with any space at a pressure lower than the pressure in the cylinders 107a to 107e, i.e., with any space which is kept at the suction pressure. For instance, it is possible to design the compressor 12 such that the by-pass holes 131a and 131b can be communicated with the suction chambers 113, crank chamber (the space in which swash plates 102 rotates) or the cylinders which are in their suction strokes. Although the swash plate type compressor of the described embodiment has 10 (ten) cylinders, the invention can be embodied with any swash plate type compressor having two or more cylinders. Needless to say, the displacement varying rings 129 and 130 may be disposed in the space between the shaft 101 and the cylinders 107a to 107e of the compressor rather than in the cylindrical spaces formed in the housing parts 105 and 106.

It is also possible to carry out the invention with a compressor of the types other than the described swash plate type, such as vane type compressor, provided that the compressor is of a variable displacement type.

The displacement varying rings 129 and 130 can be replaced by other displacement varying members depending on the type of the compressor used.

It is also possible to use a combination of a vacuum-actuated diaphragm mechanism and a link mechanism in place of the servo motor 17.

In the described embodiment, the air temperature just downstream of the evaporator is detected as an index of the condition of the cooling of the evaporator 5. This, however, is not exclusive and various factors such as surface temperature of the evaporator, refrigerant temperature in the evaporator. In place of the refrigerant temperature at the evaporator, the refrigerant pressure at the evaporator may be detected.

The pre-set resistor 15 may be installed on the control panel of the air conditioner so as to be easily manipulated by the user so that he or she can easily set the resistance value $R_{15}$ of the resistor 15. By so doing, it is possible to remote-control the room air temperature by the displacement control of the compressor.

The controlling circuit 16 and the timer circuit 27 can be incorporated into a unitary microcomputer. In the case where the air conditioning system of the invention is used on a vehicle which is driven by a diesel engine, the ignition switch 25 can be replaced either by a switch used to supply fuel and to stop the fuel supply or by a pre-heating switch. Further alternatively, the ignition switch may be replaced by a starter switch.

Figure 13:
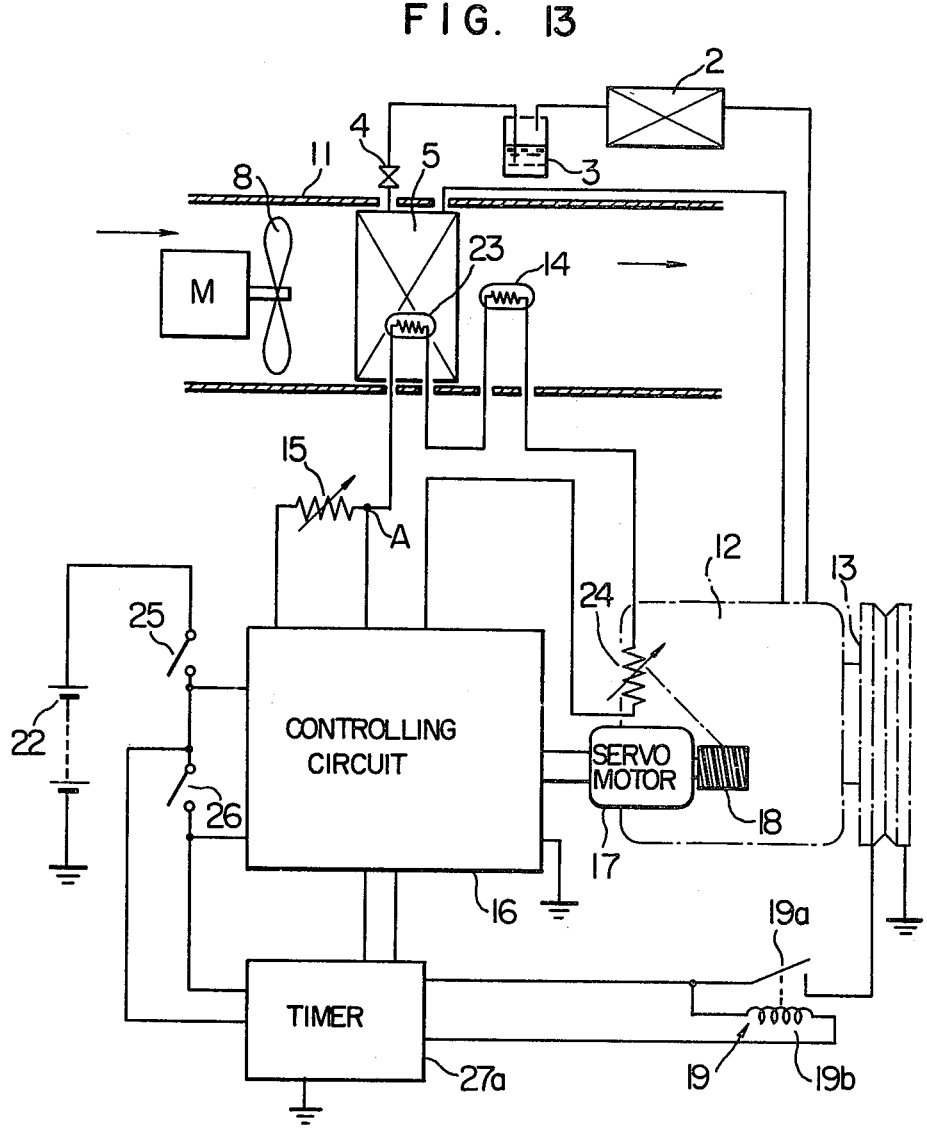
FIG. 13 is a view similar to FIG. 3 but illustrates a second embodiment of the refrigeration system according to the present invention.
Figure 14:
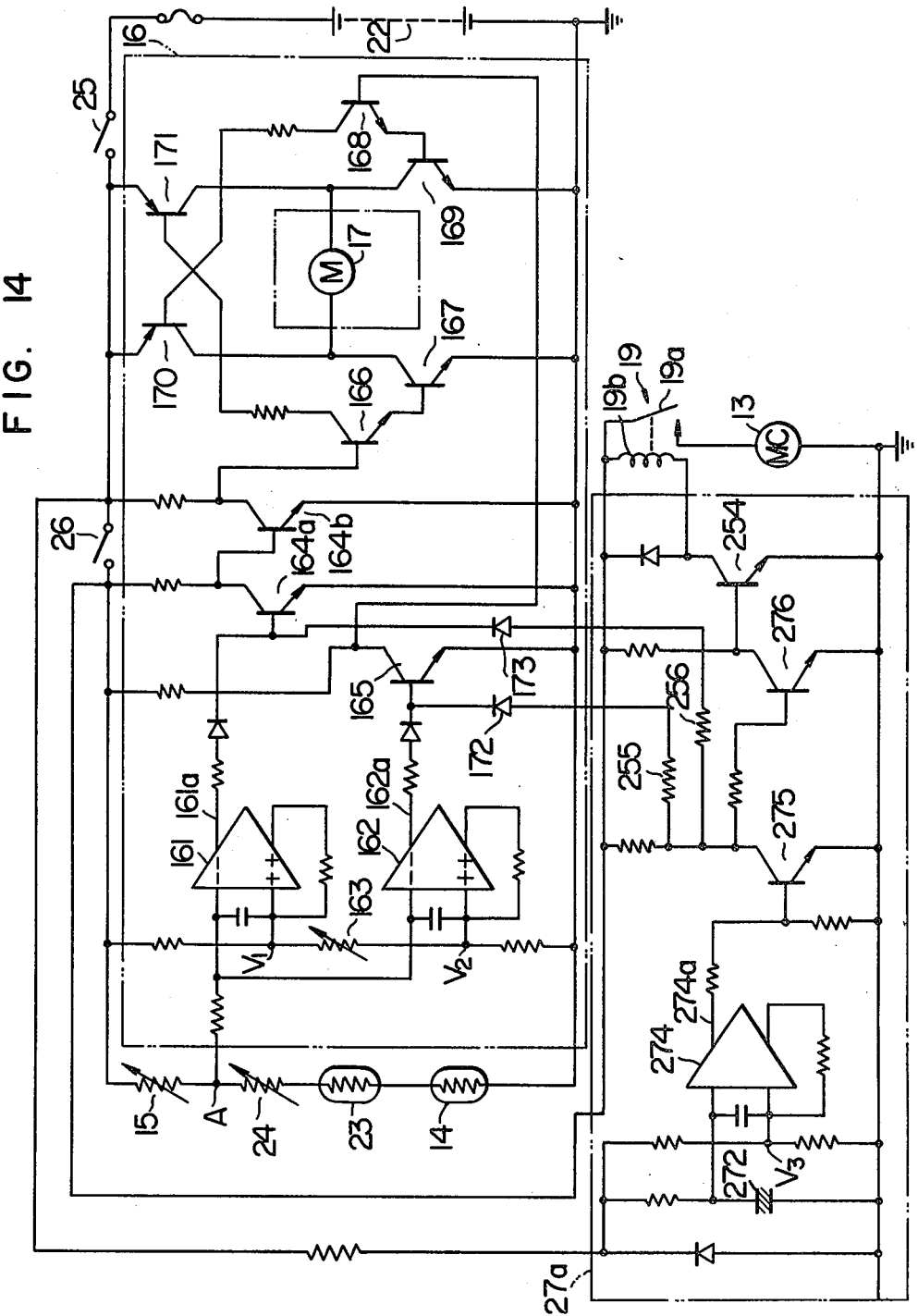
FIG. 14 is a view similar to FIG. 4 but illustrates the controlling electric circuitry of the refrigeration system shown in FIG. 13.

A second embodiment of the present invention is shown in FIGS. 13 and 14 wherein the same parts and elements as those of the first embodiment are designated by the same reference numerals. The difference only of the second embodiment from the first embodiment will be described hereunder.

A switch 19 is designed to control the electrical supply to the electromagnetic coil (not shown) of the clutch 13 and thus to control the driving connection of the compressor 12 to the engine. The switch 19 comprises a relay contact 19a and a coil 19b operative when electrically energized to close the contact 19a. A timer circuit 27a is operative to delay the electric supply to the coil 19b a predetermined time period and thus to delay the closing of the relay contact 19a. The electrical supply to the engine is controlled by an ignition switch 25 while the electrical supply to the magnetic coil of the clutch 13 is manually controlled by an air-conditioner switch 26, as in the first embodiment.

A controlling circuit 16 shown in FIG. 14 is substantially the same in construction as the circuit 16 shown in FIG. 4. The timer circuit 27a shown in FIG. 14 includes a capacitor 272 which is charged when the ignition switch 25 is closed. After the lapse of a predetermined time period, the charging voltage of the capacitor 272 reaches a level which is higher than a reference voltage V3. When this condition is attained, the output 274a of a comparator 274 is inverted from "LOW" level to "HIGH" level so that a transistor 275 is switched on, a transistor 276 is switched off and a transistor 254 is switched on with a result that electric current passes to the relay coil 19b to close the relay contact 19a for thereby electrically energizing the electromagnetic coil of the clutch 13.

Before the lapse of said predetermined time period, namely, before the charging voltage of the capacitor 272 has not yet exceeded the reference voltage V3 and thus the transistor 275 is still in its "off" state, the collector voltage of the transistor 275 is applied through resistors 255 and 256 and through diodes 172 and 173 to the bases of transistors 165 and 164a to positively switch on transistors 165 and 164a.

The operation characteristic of the controlling circuit 16 is the same as the operation characteristic of the controlling circuit 16 previously described with reference to FIG. 5.

The timer circuit 27a is operative to assure that the compressor 12 is in its minimum displacement condition. This operation will be described in more detail hereunder:

(1) In the case where the engine ignition switch 25 is turned on with the air-conditioner switch 26 kept open:

The relay coil 19b is not energized because the switch 26 is open and, therefore, the relay switch 19a is open and the electromagnetic clutch 13 disconnects the compressor 12 from the engine. When the engine is started, no load is applied to the engine by the compressor 12. Thus, the engine can be started without any adverse effect by the air conditioning system.

In addition, even if the ignition switch 25 is turned on, the output 274 of the comparator 274 is in its "LOW" level during the predetermined time period while the charging voltage of the capacitor 272 is at a level not higher than the reference voltage V3, with a result that the transistor 275 is in its "OFF" state to positively keep the transistors 165 and 164a in their "ON" states. The transistors 168, 169 and 170 are therefore in their "OFF" states, the transistor 164b is in "OFF" state and the transistors 166, 167 and 171 are in "ON" states. The predetermined time period required for the output 274a of the comparator 274 to be inverted is set to be substantially equal or longer than the time period required for the servo motor 17 to rotate the compressor displacement varying rings 129 and 130. Thus, the electric current passes to the servo motor 17 through the emitter and collector of the transistor 171 and through the collector and emitter of the transistor 167 to rotate the servo motor in the reversed or backward direction so that the angular position of the displacement varying rings 129 and 130 is varied to the minimum compressor displacement position. In this case, the servo motor 17 is rotated in the backward direction independently of the outputs of the comparators 161 and 162 whereby the compressor displacement varying rings are rotated to the minimum displacement position at which the compressor displacement is substantially equal to one third ($\frac{1}{3}$) the maximum displacement. Thus, when the air-conditioner switch 26 is turned on, the compressor 12 is started from its minimum displacement condition and applies its minimum load to the engine. Thus, the starting of the operation of the air conditioning system does not adversely affect the smooth driving feeling of the vehicle.

(2) In the case where the air-conditioner switch 26 is kept in its closed position and the engine ignition switch 25 is turned on:

In this case, the operation of the timer circuit 27A keeps the relay coil 19b in the electrically deenergized condition for the said predetermined time period, with a result that the electromagnetic clutch 13 keeps the compressor 12 out of driving connection with the engine. Thus, no load is applied by the air conditioning system to the engine when the same is started.

After the lapse of the said predetermined time period, the electromagnetic clutch 13 is rendered operative to drivingly connect the compressor 12 to the engine. At this time, however, the compressor is in its minimum displacement condition. Thus, the starting of the compressor operation does not apply a large load shock to the engine operation.

In the first and second embodiments described above, the compressor capacity or displacement varying members are placed in the minimum compressor displacement position each time when the operation of the air conditioning system is started. It is advisable if the compressor displacement varying members are moved to the maximum compressor displacement position after the lapse of a predetermined time period from the time when the operation of the air conditioning system has been started to immediately satisfy the demand for cooling. A third embodiment of the invention to be described hereunder is intended to satisfy this requirement.

Figure 15:
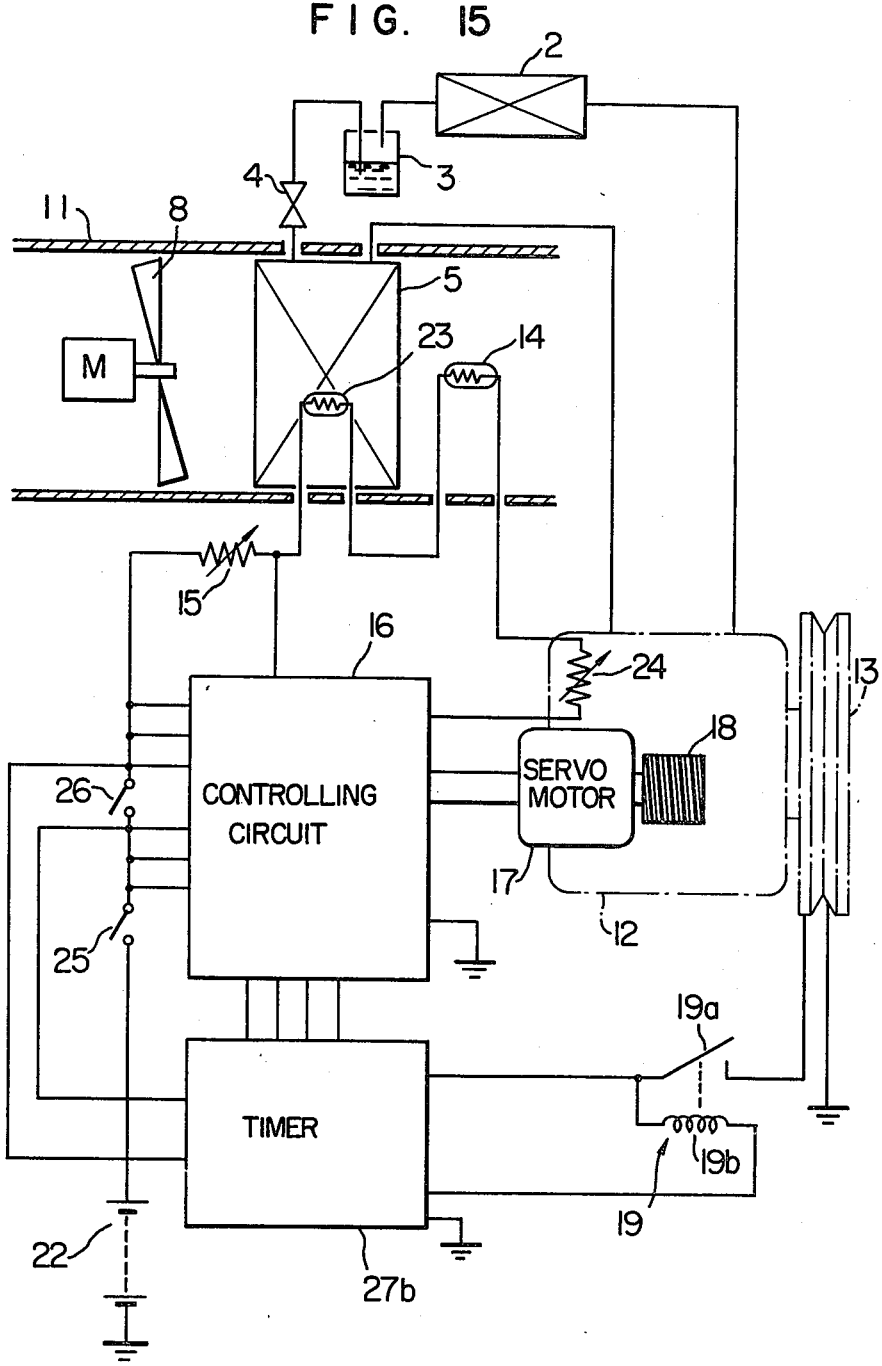
FIG. 15 is a view similar to FIGS. 3 and 13 but illustrates a third embodiment of the refrigeration system according to the present invention.
Figure 16:
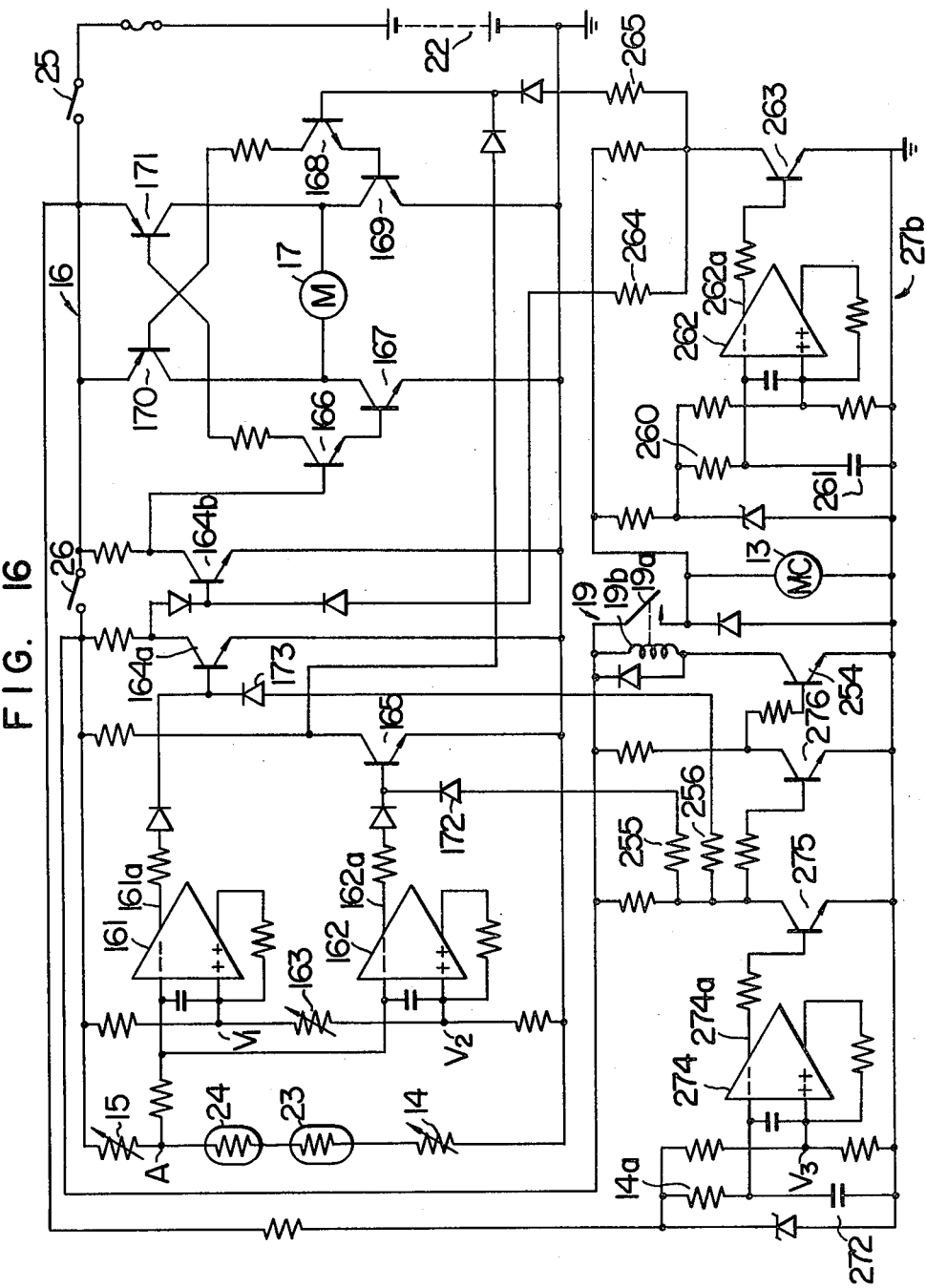
FIG. 16 is a view similar to FIGS. 4 and 14 but illustrates the controlling electric circuitry of the refrigeration system shown in FIG. 15.

The third embodiment is shown in FIGS. 15 and 16 in which the same parts and elements as those of the preceding embodiments are designated by the same reference numerals. The difference only will be discussed hereunder. The third embodiment is similar to the second embodiment shown in FIGS. 13 and 14 with the exception that the timer circuit 27a of the second embodiment is replaced by a timer circuit 27b which is operative not only to delay the operation of the relay coil 19b to close the relay contact 19a for a predetermined time period but also to emit, after the closure of the relay contact 19a, a signal for a predetermined time period to ensure that the compressor displacement varying members or rings are moved to the maximum compressor displacement position.

The structure and operation of the timer circuit 27b will be apparent from the following description. When the ignition switch 25 is turned on, a capacitor 272 of the timer circuit 27b is charged. After the lapse of the predetermined time period t, the charging voltage of the capacitor 272 exceeds a reference voltage V3 to invert the output 274a of a comparator 274 from "LOW" level to "HIGH" level, so that a transistor 275 is switched on, a transistor 276 is switched off and a transistor 254 is switched on. As a result, the relay coil 19b is electrically energized to close the relay contact 19a to electrically energize the electromagnetic coil of the clutch 13.

Before the lapse of the predetermined time period t, namely, when the charging voltage of the capacitor 272 does not rise to a level high enough to switch the transistor 275 on, the collector voltage of the transistor 275 is applied through resistors 255 and 256 and through diodes 172 and 173 to the bases of the transistors 165 and 164a to positively switch them on.

When the relay contact 19a is closed to electrically energize the coil of the electromagnetic clutch 13, a timer circuit consisting of a resistor 260 and a second capacitor 261 operates to keep the output 262a of a comparator 262 at "LOW" level for another predetermined time period z. This will mean that a transistor 263 is in "OFF" state, so that the collector voltage of the transistor 263 is applied through resistors 264 and 265 to the bases of the transistors 164b and 168 to switch them on. After the lapse of the predetermined time period z, the comparator output 262a is inverted from "LOW" level to "HIGH" level to switch the transistor 263 on, so that the application of the voltage through the resistors 264 and 265 to the bases of the transistors 164b and 168 is cancelled. Accordingly, these transistors are no longer in their "ON" states, with a result that the servo motor 17 is now capable of being actuated by signals from elements 14, 15, 23 and 24.

The timer circuit 27b is operative to assure that, each time when the clutch 13 is operated to drivingly connect the compressor 12 to the engine, the compressor displacement varying rings are placed in the minimum compressor displacement position and that, after the compressor 12 has been drivingly connected by the clutch 13 to the engine, the compressor displacement varying rings are moved to the maximum compressor displacement position. This will be discussed in more detail hereunder:

(1) In the case where the engine ignition switch 25 is turned on with the air-conditioner switch 26 kept open:

In this case, when the air-conditioner switch 26 is turned on, the compressor 12 is started from its minimum displacement condition for the reason discussed previously in connection with the case (1) of the operation of the second embodiment of the invention.

(2) In the case where the air-conditioner switch 26 is kept in its closed position and the engine ignition switch 25 is turned on:

In this case, the engine is started with the compressor 12 disconnected from the engine. After the lapse of the predetermined time period t, the operation of the compressor 12 is started in its minimum displacement condition. The reason has been discussed in detail in connection with the case (2) of the operation of the second embodiment of the invention.

(3) After the compressor 12 has been drivingly connected by the clutch 13 to the engine:

As will be apparent by the foregoing description, the compressor displacement varying members or rings 129 and 130 are placed in the minimum compressor displacement position every time when the compressor operation is started. However, when the relay contact 19a is closed, the electric current passes to the comparator 262. Until the predetermined time period z has lapsed, the output 262a of the comparator 262 is kept at "LOW" level, so that the transistor 263 is in "OF" state and the transistors 164b and 168 are in "ON" states. To the servo motor 17, therefore, the electric current passes through the emitter and collector of the transistor 170 and the collector and emitter of the transistor 169 to rotate the shaft of the servo motor 17 in the normal or forward direction so that the compressor displacement varying members are moved to the maximum compressor displacement position.

The rotation of the servo motor shaft in this occasion is based on the signal from the timer circuit 27b. Thus, the compressor 12 is operated in the maximum displacement condition for the predetermined time period z, namely, until the output 262a of the comparator 262 is inverted.

It will therefore be appreciated from the foregoing description that the compressor 12 is operated in its minimum displacement condition in its initial operation during a short period of time and, thereafter, the compressor displacement is increased to its maximum displacement level to greatly improve the cooling feeling immediately after the air conditioning system has been put into operation. More specifically, if the compressor 12 is operated in its minimum displacement condition for a long time, the air conditioning system will take a long time to cool the room air to a desired temperature level. With the air conditioning system of the third embodiment, however, the displacement of the compressor 12 is increased to its maximum displacement level immediately after the compressor operation has been started. Thus, the room air is immediately cooled to a desired temperature level. This is particularly advantageous in the case where the motorcar has been parked under the sun in summer season and the room air has been heated to a considerably high temperature.

When the predetermined time period z (from 5 to 15 minutes, for example) has lapsed, the initial maximum capacity cooling of the room air is finished. At this time, the output 262a of the comparator 262 is inverted to "HIGH" level to switch the transistor 263 on, so that the transistors 164b and 168 are now prevented from being positively switched on. After the initial cooling, therefore, the position of the compressor displacement varying members is controlled based on signals from the elements 15, 24, 23 and 14.

Figure 17:
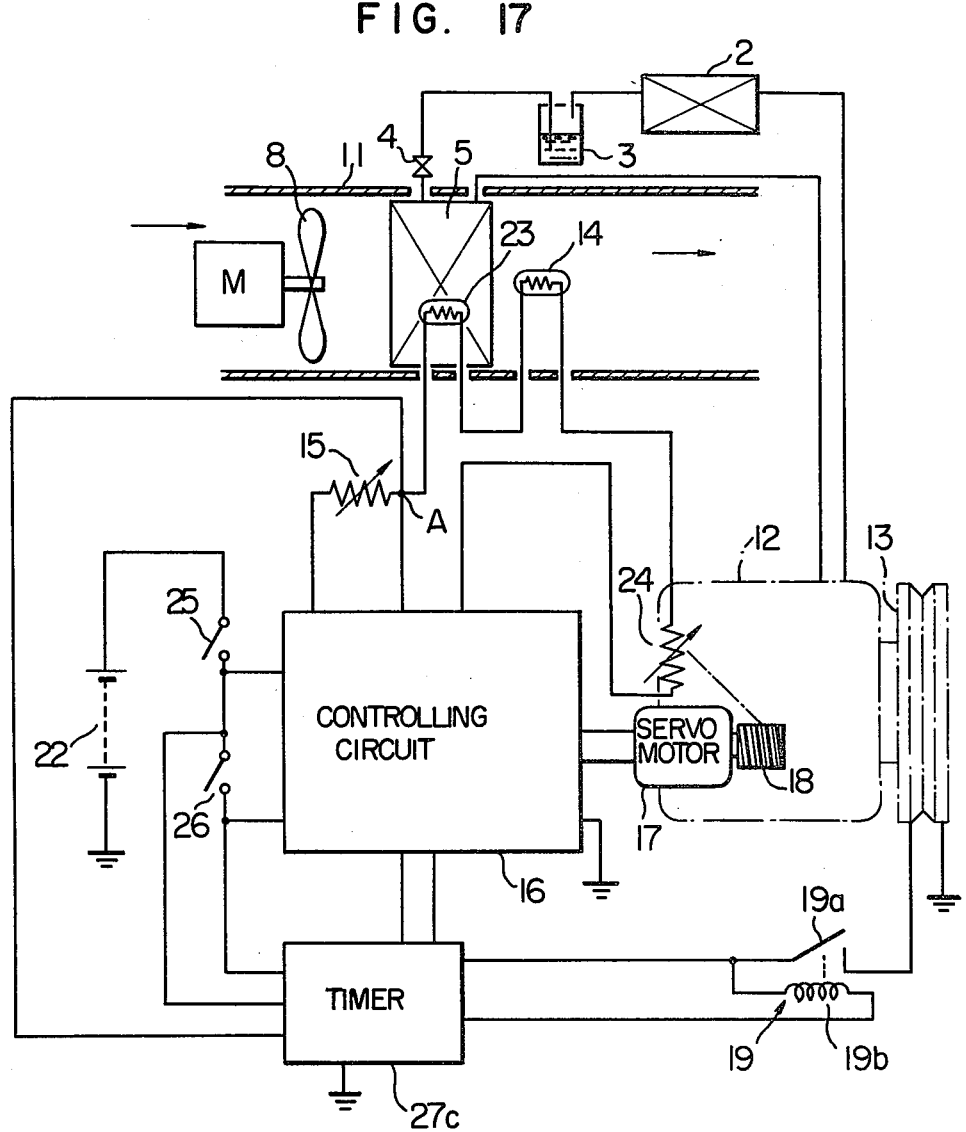
FIG. 17 is a view similar to FIGS. 3, 13 and 15 but illustrates a fourth embodiment of the refrigeration system according to the present invention.
Figure 18:
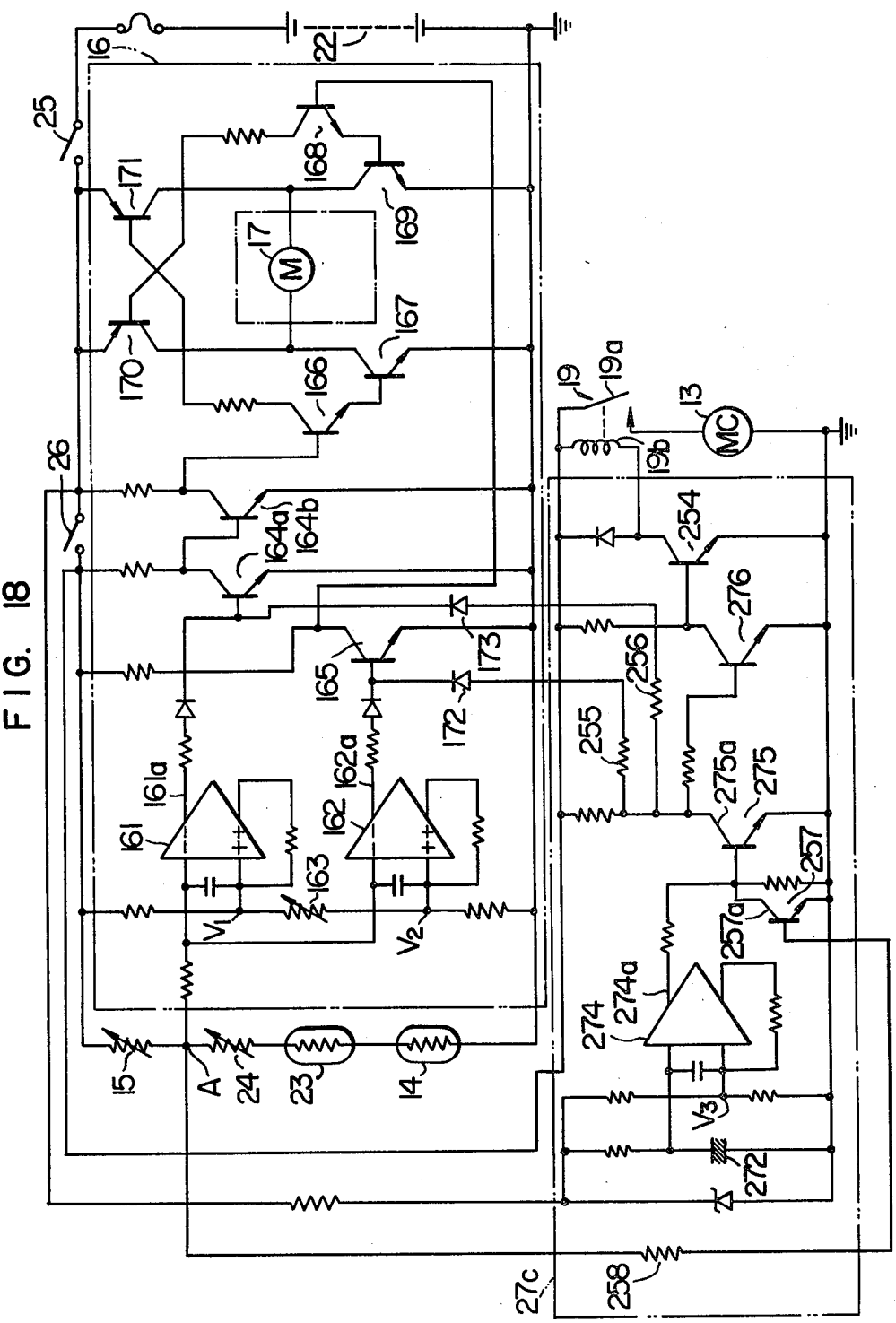
FIG. 18 is a view similar to FIGS. 4, 14 and 16 but illustrates the controlling electric circuitry of the refrigeration system shown in FIG. 17.

FIGS. 17 and 18 show a modification of the second embodiment shown in FIGS. 13 and 14. The modification comprises a timer circuit 27c which includes, in addition to the same elements as those of the timer circuit 27a of the second embodiment, a transistor 257 having a base electrically connected through a resistor 258 to the junction A between the pre-set resistor 15 and the series-connected elements 14, 23 and 24.

In operation, the electric potential at the point or junction A is at "LOW" level when the air conditioning system reaches a condition where the electromagnetic clutch 13 should drivingly connect the compressor 12 to the engine (i.e., "clutch engagement condition"). On the other hand, the potential at the junction A is at "HIGH" level when the air conditioning system is in a "clutch disengagement condition", namely, a condition where the clutch 13 should disconnect the compressor 12 from the engine. In the clutch disengagement condition, therefore, the potential at the base terminal of the transistor 275 is at a "HIGH" level so that the transistors 166, 167 and 171 are in "ON" states to place the compressor displacement varying rings 129 and 130 in the minimum compressor displacement position for the reason discussed previously. Accordingly, every time when the electromagnetic clutch 13 is in its clutch disengagement condition, the compressor 12 is in its minimum displacement condition. Thus, each time when the compressor 12 is drivingly connected to the engine, the compressor operation is started from its minimum displacement condition. In addition, when the engine ignition switch 25 is turned on with the air-conditioner switch 26 kept closed, the capacitor 272 is operative to delay the engagement of the electromagnetic clutch 13 for a period of time until the compressor displacement is reduced to its minimum level.

It has been described previously that, when $R_s$ is smaller than $R_{15}$ minus $R_c$, the transistors 166, 167 and 171 are switched off to rotate the servo motor shaft in the normal or forward direction to move the compressor displacement varying rings to the maximum compressor displacement position. It has also been described that, when $R_s$ is greater than $R_{15}$ plus $R_{163}$, the transistors 166, 167 and 171 are switched on to rotate the servo motor shaft in the reversed or backward direction to move the compressor displacement varying rings to their minimum compressor displacement position. When $R_s$ is increased to a level greater than $R_{15}$, the potential at the junction A is at "HIGH" level. When the base of the transistor 257 is supplied with a current which is greater than a current determined by the ratio between the total resistance $R_s$ of the elements 14, 23 and 24 and the resistance of the resistor 258, the potential at the collector terminal 257a of the transistor 257 is rendered "LOW" level and thus the potential at the collector terminal 275a of the transistor 275 becomes "HIGH" level, as will be seen in FIG. 19 which shows changes of the potential at the transistor terminal 275a and the potentials at the outputs 161a and 162a of the comparators 161 and 162 of the controlling circuit 16. It will be noted that the changes of the comparator outputs 161a and 162a are the same as those shown in FIG. 5.

In addition, in the case where the cooling demand is reduced, the thermister resistance $R_{14}$ of the detector 14 is increased and the resistance $R_{24}$ of the position detector 24 is reduced to the minimum level but the total resistance $R_s$ is still greater than the resistance $R_{15}$ plus the resistance $R_{163}$, the potential at the junction A is at "HIGH" level, the potential at the collector terminal 257a of the transistor 257 is at "LOW" level and the potential at the collector terminal 275a of the transistor 275 is at "HIGH" level. Thus, the transistors 166, 167 and 171 are switched on to cause the compressor displacement to be reduced to the minimum displacement. Stated in other words, it is assured that the compressor 12 is in its minimum displacement condition every time when the electromagnetic clutch 13 is in its disengagement position and, accordingly, the compressor operation can be started with its capacity kept at the minimum level.

Figure 19:
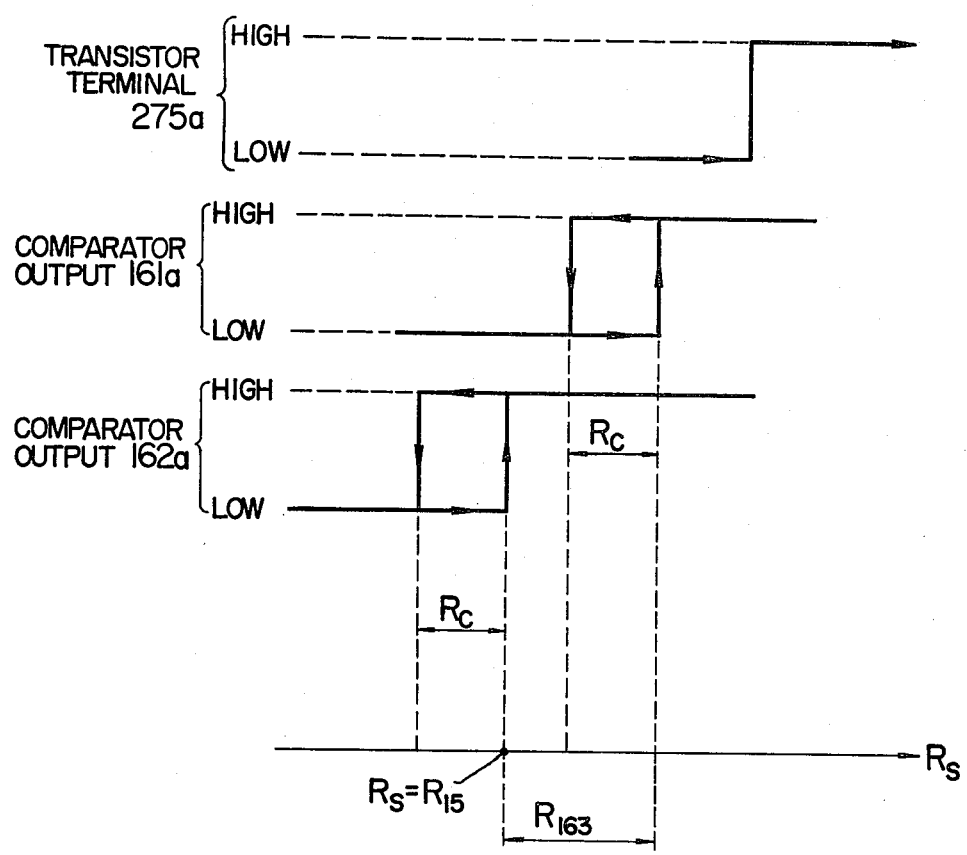
FIG. 19 illustrates the operation characteristics of comparators and a transistor of the electric circuitry shown in FIG. 18.
Figure 20:
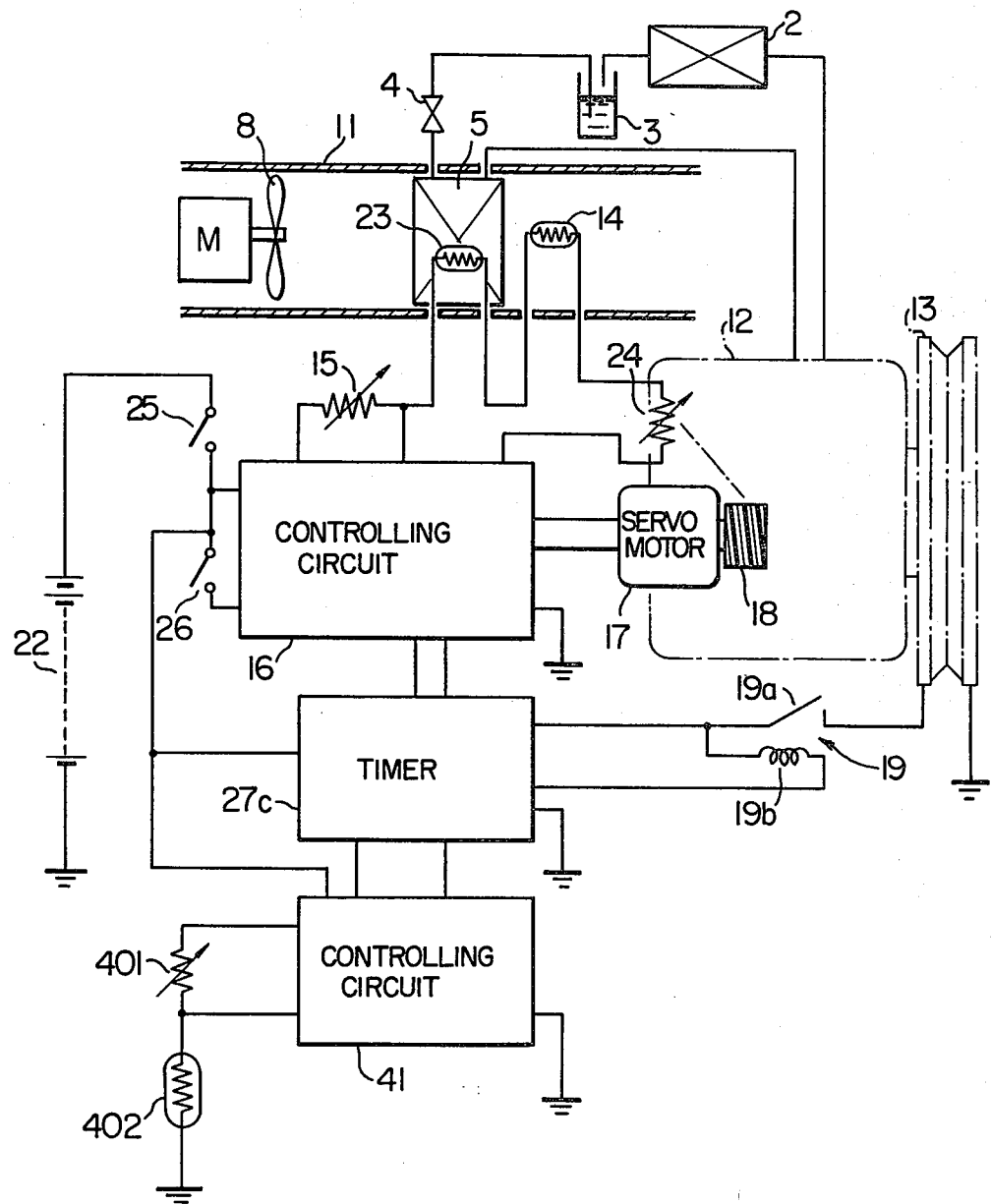
FIG. 20 is a view similar to FIGS. 3, 13, 15 and 17 but illustrates a further modified embodiment of the refrigeration system according to the present invention.
Figure 21:
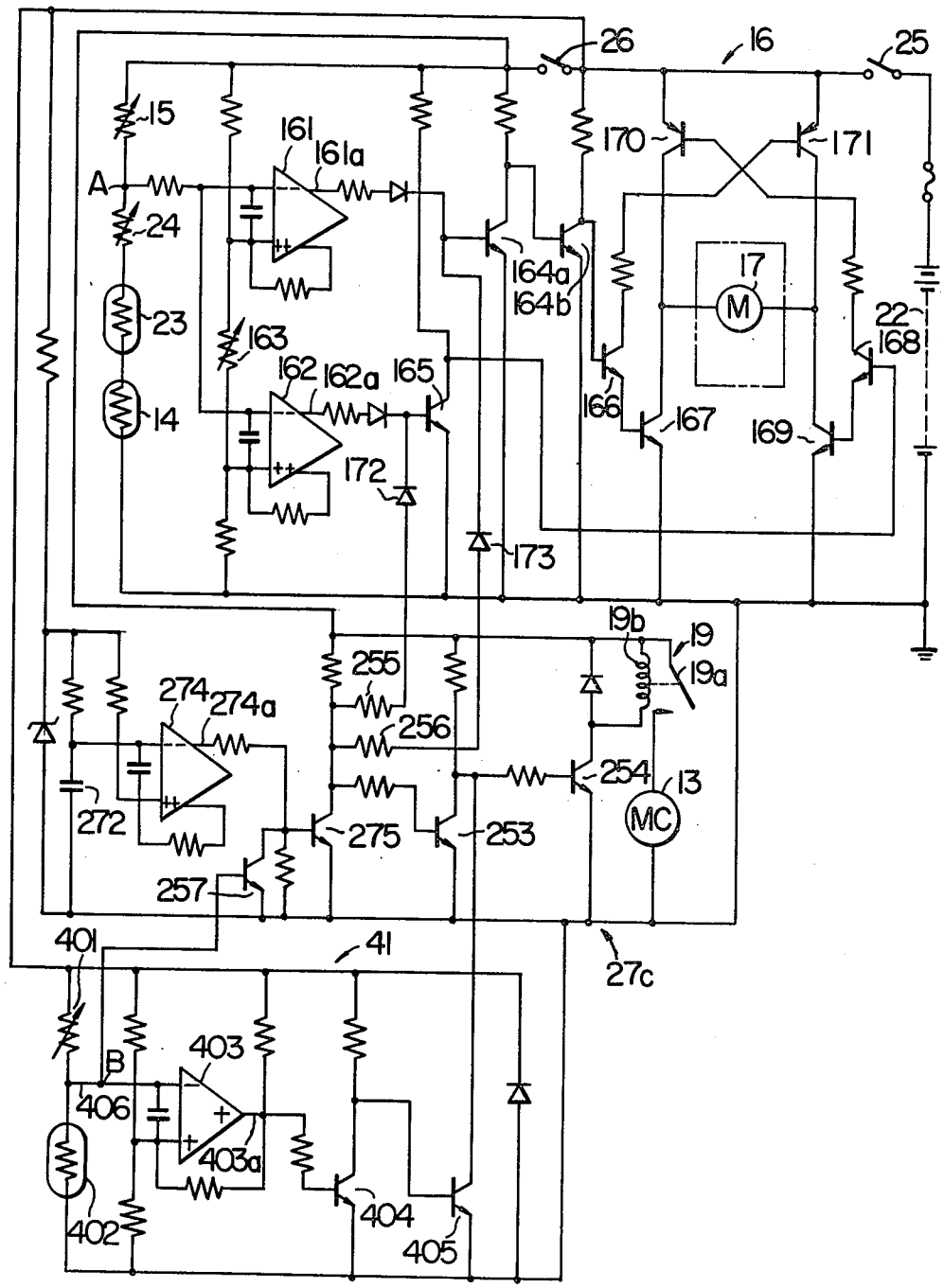
FIG. 21 illustrates a controlling electric circuitry of the refrigeration system shown in FIG. 20.

FIGS. 20 and 21 show a modification of the embodiment shown in FIGS. 17-19. The modification comprises a second controlling circuit 41, a pre-set resistor 401 and an outdoor air temperature detector 402. The controlling circuit comprises a comparator 403, a transistor 404 and a transistor 405. The minus terminal of the comparator 403 is connected by a line 406 to a line extending between the resistor 401 and the temperature detector 402. The base terminal of the transistor 257 of the timer circuit 27c is connected to the line 406 at point B. This modification is operative such that, when the air temperature detected by the detector 402 is lowered to a level less than a level pre-set by the pre-set resistor 401, the electromagnetic clutch 13 is rendered disengagement condition. More specifically, when the point B is at "HIGH" level, the output 403a of the comparator 403 becomes "LOW" level to switch the transistor 404 off and switch the transistor 405 on. Thus, the transistor 254 is switched off to electrically deenergize the relay coil 19 so that the relay contact 19a is opened. Therefore, the electromagnetic clutch 13 is rendered disengagement condition. In the clutch disengagement condition, the potential at the point B is at "HIGH" level and is applied to the base of the transistor 257 to ensure that the displacement of the compressor 12 is reduced to its minimum level. When the outdoor temperature detected by the detector 402 is raised and the electromagnetic clutch 13 is rendered engagement condition, the operation of the compressor is restarted from its minimum displacement condition.

The outdoor air temperature detector 402 may be replaced by an indoor air temperature detector, an engine cooling water temperature detector or refrigerant temperature detector for detecting the temperature of the refrigerant at the high pressure side of the refrigeration cycle.

What is claimed is:

1. An automotive refrigeration system comprising:
   a variable capacity refrigerant compressor adapted to be driven by an automotive engine and including means for varying the displacement of said compressor;
   means for driving said compressor displacement varying means to vary the displacement of said compressor;
   electric circuit means operative to assure the said compressor displacement varying means are placed in a small compressor displacement position each time when the compressor operation is started;
   wherein said electric circuit means include means for actuating said driving means to place said compressor displacement varying means in said small compressor displacement position when the engine operation is started;
   a clutch for drivingly connecting and disconnecting said compressor to and from said engine;
   wherein said electric circuit means further includes timer means for controlling said clutch so that the driving connection between said compressor and engine is delayed for a predetermined time period from the moment when the engine operation is started; and
   wherein said electric circuit means further include means for actuating said driving means to move said compressor displacement varying means from said small compressor displacement position to a large compressor displacement position after said compressor has been drivingly connected to said engine and for keeping said compressor displacement varying means in said large compressor displacement position for another predetermined time period.

2. An automotive refrigeration system according to claim 1, further including an evaporator disposed in fluid-flow communication with the intake side of said compressor, and wherein said electric circuit means further include sensor means operative to detect a condition related to the cooling operation of said evaporator and means operative in response to a signal from said sensor means to actuate said driving means for varying the displacement of said compressor.

3. An automotive refrigeration system according to claim 1, wherein said electric circuit means further include means for assuring that said compressor displacement varying means are placed in said small compressor displacement position when said clutch is put into operation to drivingly connect said compressor to said engine.

* * * * *